US011127030B2

(12) United States Patent
Torabi

(10) Patent No.: US 11,127,030 B2
(45) Date of Patent: Sep. 21, 2021

(54) SYSTEMS AND METHODS FOR COLLECTING AND DISTRIBUTING PRODUCTS INFORMATION

(71) Applicant: Cameron Torabi, Escondido, CA (US)

(72) Inventor: Cameron Torabi, Escondido, CA (US)

(*) Notice: Subject to any disclaimer, the term of this patent is extended or adjusted under 35 U.S.C. 154(b) by 1033 days.

(21) Appl. No.: 14/490,617

(22) Filed: Sep. 18, 2014

(65) Prior Publication Data

US 2015/0154624 A1 Jun. 4, 2015

Related U.S. Application Data

(60) Provisional application No. 61/911,727, filed on Dec. 4, 2013.

(51) Int. Cl.
*G06Q 30/02* (2012.01)
*H04L 29/08* (2006.01)

(52) U.S. Cl.
CPC ......... *G06Q 30/0214* (2013.01); *H04L 67/20* (2013.01); *H04L 67/22* (2013.01); *H04L 67/306* (2013.01)

(58) Field of Classification Search
CPC .... G06Q 50/01; G06Q 30/0241; G06Q 10/00; G06Q 20/20; G06Q 20/202;
(Continued)

(56) References Cited

U.S. PATENT DOCUMENTS

2005/0055281 A1* 3/2005 Williams ............... G06Q 10/00
235/383
2008/0174676 A1* 7/2008 Squilla ............... G06F 16/4393
348/231.6
(Continued)

FOREIGN PATENT DOCUMENTS

JP 2004005016 A 1/2004
KR 1020120031788 A 4/2012

OTHER PUBLICATIONS

Will et al., "Word of Mouth Mobile Marketing for Real World Recommendations" (published in 2010 14th International Conference on Intelligence in Next Generation Networks on Oct. 1, 2010) (Year: 2010).*

(Continued)

*Primary Examiner* — Abhishek Vyas
*Assistant Examiner* — Patrick Kim
(74) *Attorney, Agent, or Firm* — Procopio, Cory, Hargreaves & Savitch LLP

(57) ABSTRACT

A platform receives an indication that at least a first user has performed a data collection activity. In response, the platform allocates at least one unit of a reward to at least the first user. Data collection activity can include the first user sharing, with a second user, product information that was transmitted to the first user by the platform in response to receiving a product identifier captured by the first user. Data collection activity can also include the first user re-sharing product information received from a third user. To allocate at least one unit of a reward, the platform adds units of the reward to the first user's account. Meanwhile, the first user can also request to redeem units of the reward, in which case the platform subtracts units of the reward from the first user's account.

32 Claims, 9 Drawing Sheets

(58) Field of Classification Search
CPC .. G06Q 20/204; G06Q 20/32; G06Q 20/3221;
G06Q 20/3255; G06Q 30/02; G06Q
30/0201; G06Q 30/0207; G06Q 30/0242;
G06Q 30/0251; G06Q 30/0257; G06Q
30/0269; G06Q 30/0603; G06Q 20/02;
G06Q 20/0214; H04L 67/306; H04L
67/20; H04L 67/22
See application file for complete search history.

(56) References Cited

U.S. PATENT DOCUMENTS

| | | | | |
|---|---|---|---|---|
| 2010/0178864 A1* | 7/2010 | Chow | ............... | G06Q 30/0283 455/3.06 |
| 2011/0320250 A1* | 12/2011 | Gemmell | ........... | G06Q 30/0214 705/14.16 |
| 2012/0036365 A1* | 2/2012 | Kyslov | ............. | G06F 17/30038 713/176 |
| 2012/0047008 A1* | 2/2012 | Alhadeff | ............ | G06Q 30/0214 705/14.16 |
| 2012/0278155 A1* | 11/2012 | Faith | .................. | G06K 9/00221 705/14.26 |
| 2013/0103494 A1* | 4/2013 | Leventhal | ............. | G06Q 30/02 705/14.49 |
| 2013/0144705 A1* | 6/2013 | Gao | ................... | G06Q 30/0282 705/14.27 |
| 2013/0191174 A1 | 7/2013 | Zhou et al. | | |
| 2014/0040134 A1* | 2/2014 | Ciurea | ................. | G06Q 20/383 705/44 |
| 2014/0114737 A1* | 4/2014 | Espejo | ................... | G06Q 30/02 705/14.27 |

OTHER PUBLICATIONS

International Search Report received in corresponding International application No. PCT/US2014/056673, dated Dec. 12, 2014, 3 pages.

* cited by examiner

SYSTEMS AND METHODS FOR COLLECTING AND DISTRIBUTING PRODUCTS INFORMATION

CROSS REFERENCE TO OTHER APPLICATIONS

This application claims the benefit under 35 U.S.C. § 119(e) to U.S. Provisional Patent Application No. 61/911,727, filed Dec. 4, 2013 and entitled SYSTEMS AND METHODS FOR COLLECTING PRODUCTS INFORMATION, which is incorporated herein by reference for all purposes.

BACKGROUND

Related Field

The subject matter discussed herein relates generally to data processing and, more particularly, to systems and methods for collecting and distributing product information.

Related Background

In addition to voice data, modern personal mobile devices are capable of acting both as a source and a destination for a gamut of multimedia data. The proliferation of these types of devices (e.g., smartphones, tablet PCs) along with a host of constantly improving built-in features (e.g., camera, GPS, high speed Internet access) have given rise to myriads of advanced data collection and reception points. Furthermore, since modern personal mobile devices afford users with unprecedented levels of portability and convenience, users are becoming increasingly dependent on and attached to their mobile devices. Regardless of the time or location, a vast majority of users keep a mobile device on hand. Hence, mobile devices are almost always available to capture various types of data whenever and wherever the need or the opportunity arises.

At the same time, a wealth of information can also be disseminated to each and every mobile device. Not only are modern personal mobile devices highly evolved data processing units that can handle all manners of multimedia data, they also have a captive audience in each one of their respective users. Users constantly rely on their mobile devices to gain quick and certain access to a multitude of information. For example, when a customer in a retail outlet discovers a new or an unfamiliar brand or product, the customer very likely uses a mobile device to search for information on that brand or product. Thus, mobile devices offer tremendous potential as a strategic channel for businesses to promote their products and services.

Nevertheless, neither consumers nor businesses have been able to fully capitalize on the latest boon in mobile device technology. There is a dearth of services that directly enhance the consumer retail experience, particularly in a brick and mortar setting. Meanwhile, businesses have so far been only able to collect in-store data at the check-out (i.e., when a customer purchases or returns an item) or by undertaking expensive yet ineffective surveys. Many conventional mechanisms for collecting consumer data fail primarily because they do not offer any practical and compelling incentives to encourage a consistent and frequent voluntary input of data from consumers. Thus far, businesses do not have any effective tools for directly procuring data that fully and adequately reflects in-store consumer behavior.

DETAILED DESCRIPTION

Figure 1:
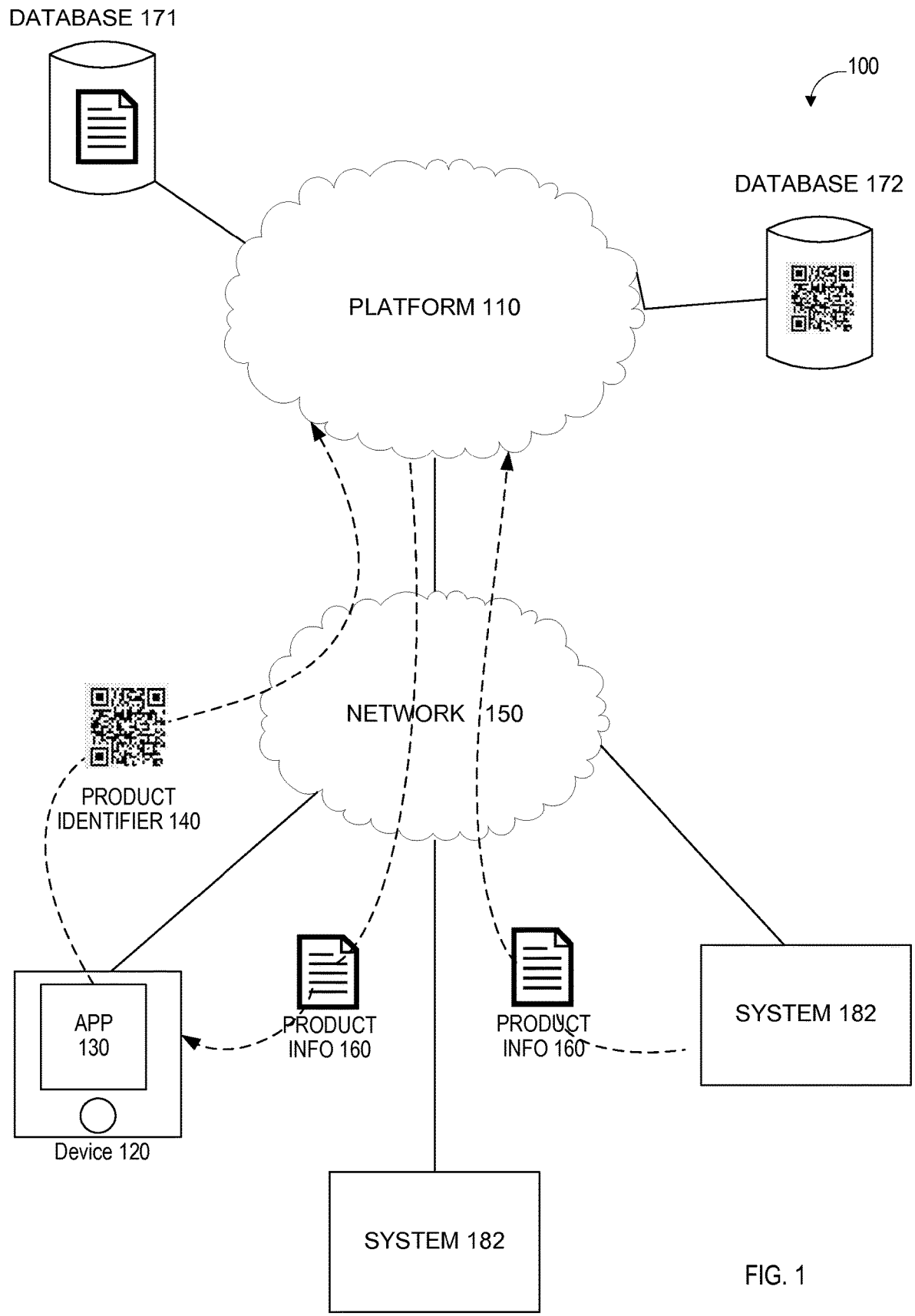
FIG. 1 is a diagram illustrating an embodiment of a system for collecting and distributing product information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Many different types of codes or identifiers are being used nowadays to identify products. Most of the products consumers encounter on a daily basis will have at least one form product identifier. Some of the most commonly used types of product identifiers in use today include barcodes and two-dimensional, matrix codes (e.g., a quick response or QR code). Although the terms "product" and "products" are used throughout, it is to be understood that the systems and the methods described herein are applicable to and can be used with respect to any category of tangible and nontangible commercial goods and offerings, including but not limited to services, securities, and real estate.

Various embodiments of the systems and methods described herein include an application that a user can install onto a device. In particular, in various embodiments, the application is to be installed onto a mobile device such as a smartphone or a tablet PC. In one aspect of the systems and methods described herein, the application permits the mobile device to serve as both a source (e.g., collection point) and a destination (e.g., access point) of various types of data, including but not limited to product identifiers, product information, and rewards data. In one embodiment, the application allows the user to capture (e.g., scan, photograph) various types of product identifiers (e.g., barcode, QR code) using his or her mobile device. In some embodiments, users who use the mobile application to capture product identifiers are referred to as data collectors. In some embodiments, using the mobile application to capture product identifiers is one form of data collection activity. Other forms of data collection activities, in various embodiments, include the sharing of product information that is received as a result of capturing and transmitting product identifiers to a remote platform.

In some embodiments, using the mobile application to capture product identifiers is one way for a user to become a data collector. For example, Alice is shopping at ACME. She can use her smartphone to scan the QR code on Product A. In some embodiments, Alice is now considered a data collector. As discussed earlier, some of the embodiments described herein further include a remote platform. In various embodiments, product identifiers captured by individual mobile devices, such as the QR code and the barcode captured by Alice, are transmitted to the remote platform along with one or more other types of information for further processing.

One or more entities in the supply chain (e.g., manufacturer, wholesaler, and retailer) can provide relevant product information that can be associated with each product identifier. Although product knowledge engenders consumer confidence and stimulates purchases, it is not always feasible or desirable to display large amounts of information on or alongside each product. Very often, detailed product information (e.g., instruction manuals) is enclosed inside product packaging and is not accessible without first purchasing the product. Thus, in order to provide straightforward access to product information, in some embodiments, relevant product information may be stored at the remote platform. The types of product information stored at the remote platform can include but are not limited to detailed descriptions of the corresponding merchandise, composition and material, handling and care instructions, a link to the manufacturer (e.g., a URL), related or alternative products and/or services (e.g., accessories, warranties, etc.), and promotions (e.g., coupons, rebates).

In some embodiments, the remote platform receives a product identifier that was captured by a collector and retrieves the product information that corresponds to the product identifier. In some embodiments, a selection of some or all of the information relevant to the product is transmitted to the user's mobile device where it can be displayed to the user via the application. For instance, by scanning the QR code for Product A, Alice is promptly presented with different types of information regarding Product. Advantageously, access to comprehensive product information encourages consumers, particularly ambivalent ones, to purchase the product. Moreover, instant and convenient access to copious product information incentivizes data collectors like Alice to use the mobile application on a frequent and consistent basis.

In some embodiments, data collectors are given additional rewards or perks (e.g., royalty points) to further encourage various types of data collection activities, such as capturing product identifiers and sharing product information with both other data collectors and non-collectors. For example, ACME can give Alice one or more reward points for every QR code or barcode she captures using her mobile device while perusing an ACME store. In addition, Alice can have opportunities to earn even more reward points if she shares the product information about Product A with her friend Bob.

Many different types of entities, including but not limited to manufacturer, wholesaler, retailer, product designers, government and research organizations, and advertisers can reap tremendous benefits from a large and dedicated base of data collectors, who generate a rich assortment of consumer behavioral data. In some embodiments, the remote platform stores the information generated by various data collectors. In some embodiments, the remote platform processes (e.g., segment, filter based on demographics) before or in addition to storing the information generated by various data collectors. In some embodiments, information from various data collectors includes but is not limited to the product identifiers (e.g., QR code, barcode) captured by each data collector. In some embodiments, information from various data collectors further includes other information that is concomitant to the capture of each identifier (e.g., location, date and time, and environment information). In some embodiments, information from various data collectors can also include descriptive details about each data collector, including personally (e.g., name, address, email) and non-personally identifiable data (e.g., age, gender, occupation). In various embodiments, data collectors can choose to omit various descriptive details such as personally identifiable data like name, address, email, etc.

In some of the embodiments described herein, data subscribers (e.g., manufacturer, wholesaler, retailer, product designers, government and research organizations, and advertisers) are able to access some or all of the information from various data collectors that the remote platform has received, processed, and/or stored. For instance, ACME can subscribe to information or specific sets of information that data collectors such as Alice have generated.

FIG. 1 illustrates an embodiment of a system for collecting and distributing product information described herein. System 100 includes Platform 110. System 100 further includes Device 120. In some embodiments, Device 120 is a personal mobile device (e.g., smartphone, tablet PC) that may be running one of a variety of different operating systems (e.g., iOS, Android, Windows Mobile, Blackberry OS, etc.). In various embodiments, to become a data collector, a user of Device 120 starts by installing a version of Application 130 that is appropriate for the operating system running on Device 120. In various embodiments, Application 130 is configured to capture information including Product Identifier 140. In some embodiments, Application 130 scans or photographs Product Identifier 140, which can be a barcode, a QR code, or any other appropriate type of code or identifier. In some embodiments, Application 130 is further configured to obtain information related to the capture of Product Identifier 140. For example, Application 130 can determine when and where Product Identifier 140 was captured. As another example, Application 130 can solicit and collect descriptive details about the user of Device 120, such as by prompting the user to input information such as name, address, email, age, gender, and occupation.

In various embodiments, Device 120 is capable of communicating with Platform 110 via Network 150. In some embodiments, Device 120 communicates with Platform 110 by sending information to Platform 110. For instance, Device 120 transmits Product Identifier 140 to Platform 110. Device 120 can additionally transmit concomitant information (e.g., time, location, data collector description) that conveys who, when, and where Product Identifier 140 was captured. In some embodiments, Device 120 also communicates with Platform 110 by receiving information from Platform 110. In response to Product Identifier 140, Platform 110 is configured to transmit Product Information 160, which corresponds to Product Identifier 140, to Device 120. In some of the embodiments described herein, Platform 110 also processes and stores at least some of the information received from Device 120 in Database 171. In some embodiments, Database 171 stores product identifiers, such as Product Identifier 140, as they are captured by various data collectors using devices such as Device 120. In some embodiments, Database 171 further stores additional information associated with each captured product identifier, including information pertinent to each of the data collectors who captured the product identifier (e.g., descriptive details) and environment information (e.g., time, location).

As shown, Platform 110 is further communicatively connected via Network 150 to System 181. In some embodiments, System 181 is affiliated with an entity (e.g., manufacturer, wholesaler, retailer, product designers) that is associated with the product associated with Product Identifier 140. In some embodiments, System 181 is associated with any entity that is capable of providing at least some information on the product that corresponds to Product Identifier 140. In some embodiments, Platform 110 uploads product information relating to multiple products, including Product Information 160, from System 181 in batches and then stores the batches of product information in Database 172. In those embodiments, when Device 120 transmits Product Identifier 140 to Platform 110, Platform 110 locates and retrieves corresponding Product Information 160 from Database 172. In some embodiments, Platform 110 retrieves product information, such as Product Information 160, from System 181 individually and on demand. In this case, when Device 120 transmits Product Identifier 140 to Platform 110, Platform 110 is configured to respond dynamically by requesting Product Information 160 from System 181 upon the receipt of Product Identifier 140.

As shown, Platform 110 is further communicatively connected via Network 150 to System 182. In some embodiments, System 182 is associated with an information subscriber and Platform 110 is configured to provide at least some of the information stored in Database 171 to System 182. For example, System 182 may be affiliated with an entity associated with or otherwise interested in the product (e.g., a manufacturer, wholesaler, retailer, product designers, government and research organization, and advertiser) and Platform 110 can provide a specifically processed (e.g., segmented, filtered) set of data to System 182.

Incentivizing Data Collection Activities

In some embodiments, one or more entities (e.g., retailers, manufacturers, wholesalers) can use Platform 110 to implement one or more rewards programs that motivates or incentivizes data collectors to engage in various forms of data collection activities. For example, in some embodiments, a data collector can gain and accrue reward points for using an application (e.g., Application 130 installed on Device 120) to capture product identifiers (e.g., Product Identifier 140) and to receive corresponding product information in return (e.g., Product Information 160). In some embodiments, the data collector can gain and accrue additional reward points for sharing the product information (e.g., Product Information 160) and when the product information (e.g., Product Information 160) is re-shared. In various embodiments, each data collector is associated with an individual or personal account that tracks various forms of reward transactions. On the one hand, rewards are added, credited, or deposited into an account whenever a data collector directly or indirectly engages in one or more data collection activities. At the same time, in various embodiments, rewards can be subtracted, removed, or withdrawn from the account whenever they are redeemed by the data collector. As will be discussed in more detail below, in some embodiments, only those accounts that are associated with registered data collectors can actively collect and accumulate rewards.

In various embodiments, individual data collectors are able to track their rewards by accessing their personal accounts through the application or, alternately or in addition, through a dedicated website. For example, in some embodiments, Alice can view her latest rewards statistics (e.g., last rewards earned/redeemed, total rewards earned/redeemed, etc.) and most recent data collection activities in her account through Application 130 or by going to a special website (e.g., www.datacollectorrewards.com).

It is to be understood that any appropriate type, form, or manner of rewards can be implemented in the various embodiments of the systems and methods described herein. Furthermore, in addition to allotting and tracking reward points, Platform 110 is further capable of tracking and facilitating the use (e.g., redemption) of reward points. For example, if ACME allows data collectors to redeem reward points for coupons and/or certificates, Alice can redeem some or all of her accrued reward points for one or more coupons and/or certificates through Application 130. In various embodiments, certain forms or types of rewards or redeemed rewards can be delivered directly to and used from a mobile device such as Device 120. To continue with the example, after Alice redeems some or all of her reward points for coupons and/or certificates, Platform 110 can deliver the coupons and/or certificates directly to her smartphone. If Alice then wishes to use her coupons and/or certificates, whether at ACME or elsewhere, the coupons and/or certificates can be scanned directly from her smartphone.

Figure 2:
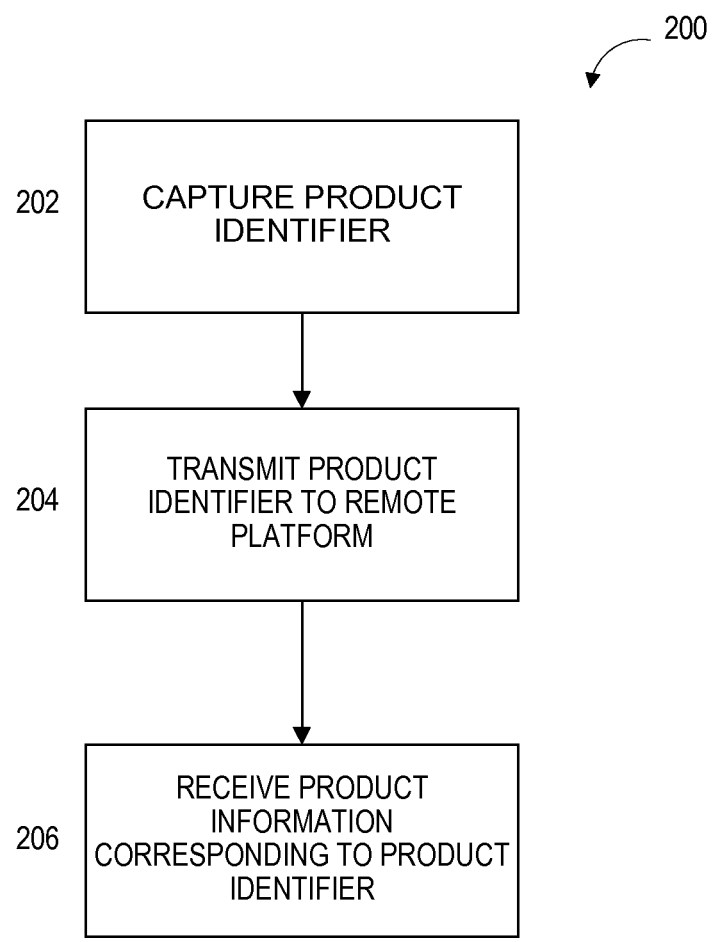
FIG. 2 is a flowchart illustrating an embodiment of a process for collecting product information.

FIG. 2 illustrates an embodiment of a Process 800 for collecting product information. In some embodiments, Process 800 is performed by a mobile device (e.g., Device 120) operated by a data collector. In various embodiments, the mobile device (e.g., Device 120) is installed with an application (e.g., Application 130) that allows the operator of the mobile device to collect and transmit product information (e.g., Product Identifier 140) to a remote platform (e.g., Platform 110), and to receive product information (e.g., Product Information 160) from the remote platform (e.g., Platform 110) in return.

Process 800 begins at 202 when a product identifier is captured, such as by a data collector using an application (e.g., Application 130). As one example, Alice can use Application 130 installed on her smartphone, Device 800, to capture Product Identifier 140. At 204, the captured product identifier is transmitted to a remote platform (e.g., Platform 110). In various embodiments, the remote platform (e.g., Platform 110) first locates product information that corresponds to the captured product identifier (e.g., Product Information 160). In some embodiments, the remote platform (e.g., Platform 110) can aggregate product information, including by collecting product information from various sources (e.g., manufacturers, wholesalers, retailers) in batches, and store the product information in a database (e.g., Database 172). Alternately, in other embodiments, the remote platform can obtains product information on-demand. In the example above, Platform 110 is able to locate Product Information 160 (e.g., in Database 172 or from System 181), which corresponds to Product Identifier 140. In various embodiments, the remote platform further transmits the product information back to the mobile device. Thus, in addition to locating Product Information 160, Platform 110 also transmits Product Information 160 back to Alice's smartphone, Device 120.

Finally, at 206, product information that corresponds to the product identifier is received. Advantageously, in various embodiments, the remote platform (e.g., Platform 110) is able to provide product information (e.g., Product Information 160) that is not readily available or accessible to a browsing customer. In the example, by scanning Product Identifier 140 using her smartphone, Alice can subsequently receive a wealth of product information including but not limited to a detailed descriptions of the corresponding merchandise (e.g., Product A), composition and material, handling and care instructions, a link to the manufacturer (e.g., a URL), related or alternative products and/or services (e.g., accessories, warranties, etc.), and promotions (e.g., coupons, rebates).

According to the various embodiments of the systems and methods described herein, data collectors are able to capture product identifiers and receive detailed product information using their mobile devices virtually anytime and anywhere. Advantageously, in various embodiments, easy access to abundant and useful product information inherently encourages data collectors to engage in data collection activities (e.g., capturing identifiers, sharing product information). In addition, in the various embodiments described herein, the provision of one or more forms of incentives (e.g., reward points, coupons, discounts, raffle entries) further encourages frequent and habitual use of the mobile application to engage in data collection activities. In the example described above, Product A can be a new or unfamiliar item that Alice encounters while she is perusing an ACME store. ACME has implemented a rewards program for frequent data collectors. The prospect of gaining reward points prompts Alice to use the mobile application instead of a conventional search engine to obtain more information on Product A. Meanwhile, Platform 110 is able to track Alice's data collection activities, including her interaction with Product A. For instance, Platform 110 can register Alice's initial interest in Product A and then monitor for subsequent activities (e.g., sharing the information on Product A with Bob, purchases of Product A by either Alice or Bob, etc.). These types of information provide significant and nuanced insight into consumer behavior. For instance, ACME can use this data to assess the level of consumer interest in various products, gauge the effectiveness of current product displays and promotions, etc.

Figure 3:
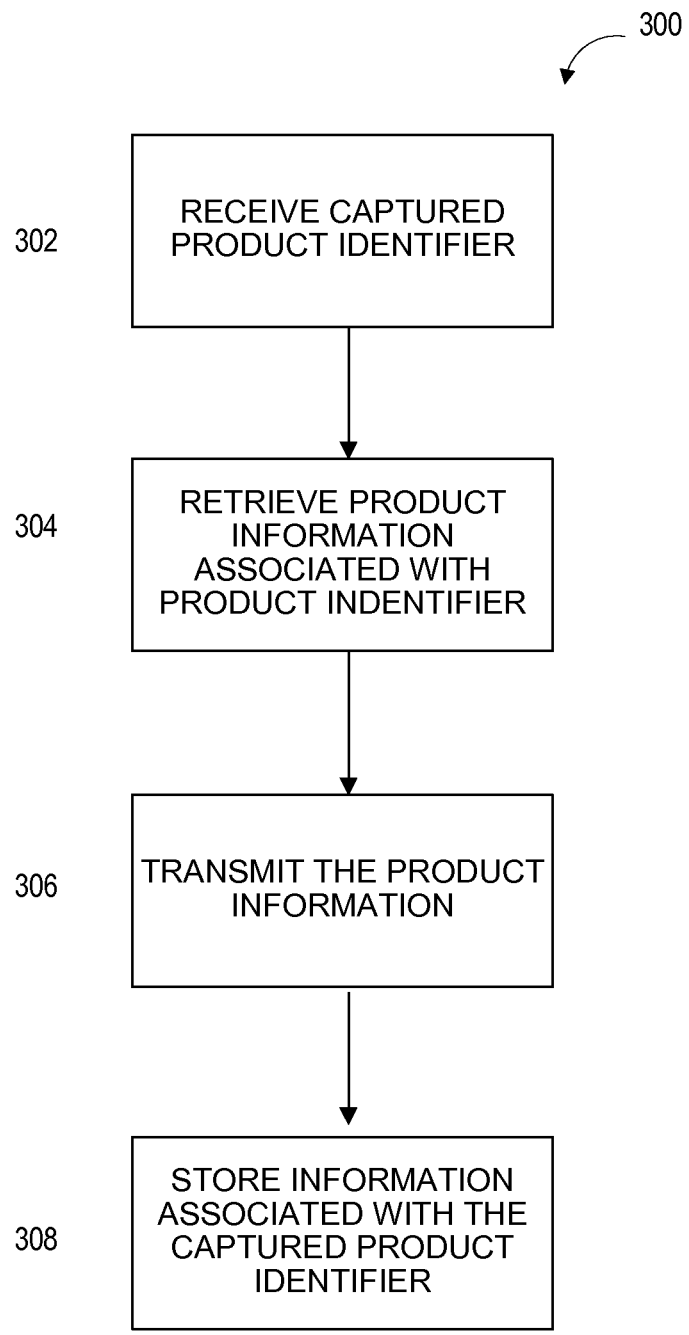
FIG. 3 is a flowchart illustrating an embodiment of a process for collecting product information.

FIG. 3 illustrates an embodiment of a process for collecting product information. In some embodiments, Process 300 is performed by Platform 110. In various embodiments, Process 300 begins at 302 when a product identifier captured by a mobile device is received. For example, Platform 110 can receive Product Identifier 140, which Alice had captured using the Application 130 installed on her smartphone, Device 120. In various embodiments, in addition to Product Identifier 304, Platform 110 also receives information pertaining to the data collector (e.g., personally and/or non-personally identifiable descriptive details) and environment information associated with the capture of Product Identifier 140 (e.g., time, location). At 304, product information (e.g., Product Information 160) associated with the product identifier is retrieved. In some embodiments, Platform 110 is configured to obtain product information from various sources (e.g., manufacturers, wholesalers, retailers) in batches and ahead of the time, and to store the product information in Database 172. In various other embodiments, Platform 110 is configured to respond to the product identifier by retrieving the product information from various sources (e.g., manufacturers, wholesalers, retailers) on the fly. At 306, the product information is transmitted. In some embodiments, the product information is transmitted to a mobile device (e.g., Device 120) to be displayed by the installed application (e.g., Application 130). For instance, Platform 110 transmits Product Information 160 to Alice's smartphone, Device 10. In some embodiments, product information can be transmitted through various additional or alternate channels, including but not limited to email, instant messaging, and SMS. Thus, Alice can receive Product Information 160 through one or more appropriate channels, including but not limited to Application 130, her email, IM, and SMS. At 308, some or all of the information associated with the captured product identifier is stored in a repository. Platform 110, in various embodiments, is configured to collect, over time, product identifiers that have been captured by various data collectors as well as any attendant information (e.g., data collector information, environment information). In some embodiments, Platform 110 is configured to process (e.g., segment, filter) the information and to provide at least some of the information to various data subscribers.

In some embodiments, data collectors are incentivized to share product information (e.g., Product Information 160) that they receive in response to capturing product identifiers (e.g., Product Identifier 140) and from other data collectors. Additionally, in certain embodiments, data collectors can be given additional rewards whenever product information they have shared is re-shared by another data collector. In some embodiments, entities (e.g., retailers, manufacturers, wholesalers) that use Platform 110 to implement one or more rewards program can further use these rewards programs to harness the marketing potential of a large network of enthusiastic data collectors. In the example described earlier, Alice can earn reward points for sharing the product information she obtained on Product A. In some embodiments, data collectors can choose the manner in which to share product information. For instance, Alice can use text or email to send the product information directly to one or more other individuals, or she can include the product information in one or more social media postings (e.g., Facebook, Twitter).

In various embodiments, data collectors are able to share product information with not just other data collectors, but with any mobile device user or operator (i.e., "non-data collectors"). In some embodiments, data collectors are afforded additional opportunities to earn rewards by recruiting or otherwise encouraging non-data collectors to become data collectors. In some embodiments, a non-data collector becomes a data collector by downloading Application 130, engaging in data collection activities, and/or, as will be discussed in more detail below, registering with Platform110. In some embodiments, Application 130 is able to recognize data collectors and can therefore automatically distinguish between data collector and non-data collector recipients of shared product information.

In some embodiments, Application 130 queries Platform 110 in order to determine whether a recipient of product information is a data collector or a non-data collector. For example, suppose Alice, who is a registered data collector, shares information on Product A with both Bob and Charlie. Bob is another data collector but Charlie is not (i.e., Charlie has not used Application 130 to capture any product identifiers). Consequently, in various embodiments, Platform 110 is configured to give Alice reward points for sharing the product information with Bob and Charlie. However, in various embodiments, when Alice shares information on Product A with Bob and Charlie, Application 130 first queries Platform 110 in order to determine whether Bob and Charlie are each a data collector. In various embodiments, based on responses from Platform 110 (i.e., Bob is a data collector but Charlie is not), Application 130 is further configured to transmit back to Platform 110 indications specifying Alice's data collection activities (i.e., shared Product Information 160 with one data collector and one non-data collector) such that Platform 110 can credit, add, deposit, or otherwise record the appropriate amount, value, or type of reward to Alice's account.

In various embodiments, both Platform 110 and Application 130 provide functionalities to facilitate the recruitment of potential data collectors and, as will be discussed in more detail below, the registration of data collectors. In various embodiments, when a non-data collector (e.g., Charlie) receives product information shared by a data collector (e.g., Alice), Platform 110 is configured to automatically set up and reserve an account for the non-data collector. However, in those embodiments, the account remains inactive (i.e., unable to collect and accumulate rewards) until the non-data collector becomes a data collector, including by engaging in data collection activities or by registering to become a data collector. In addition, in various embodiments, the data collector (e.g., Alice) has the option to personally invite the non-data collector (e.g., Charlie) to become a data collector as well. For example, in some embodiments, when Alice can send Charlie an invitation. In some embodiments, the invitation asks Charlie to activate his data collector account, including by registering as a data collector or by engaging in data collection activities. In some embodiments, the invitation can include a link to a data collector registration page where Charlie can complete the registration process prerequisite to becoming a data collector. In some embodiments, the invitation can also include a link to download Application 130. In some embodiments, the invitation can include, in addition, a personal message from Alice. In various embodiments, Platform 110 is able to track the actions that the recipient (i.e., Charlie) takes with respect to the invitation. In some embodiments, for example, Platform 110 is configured to give Alice additional reward points when Charlie becomes a data collector such as by completing the registration process and/or by engaging in data collection activities.

Figure 4:
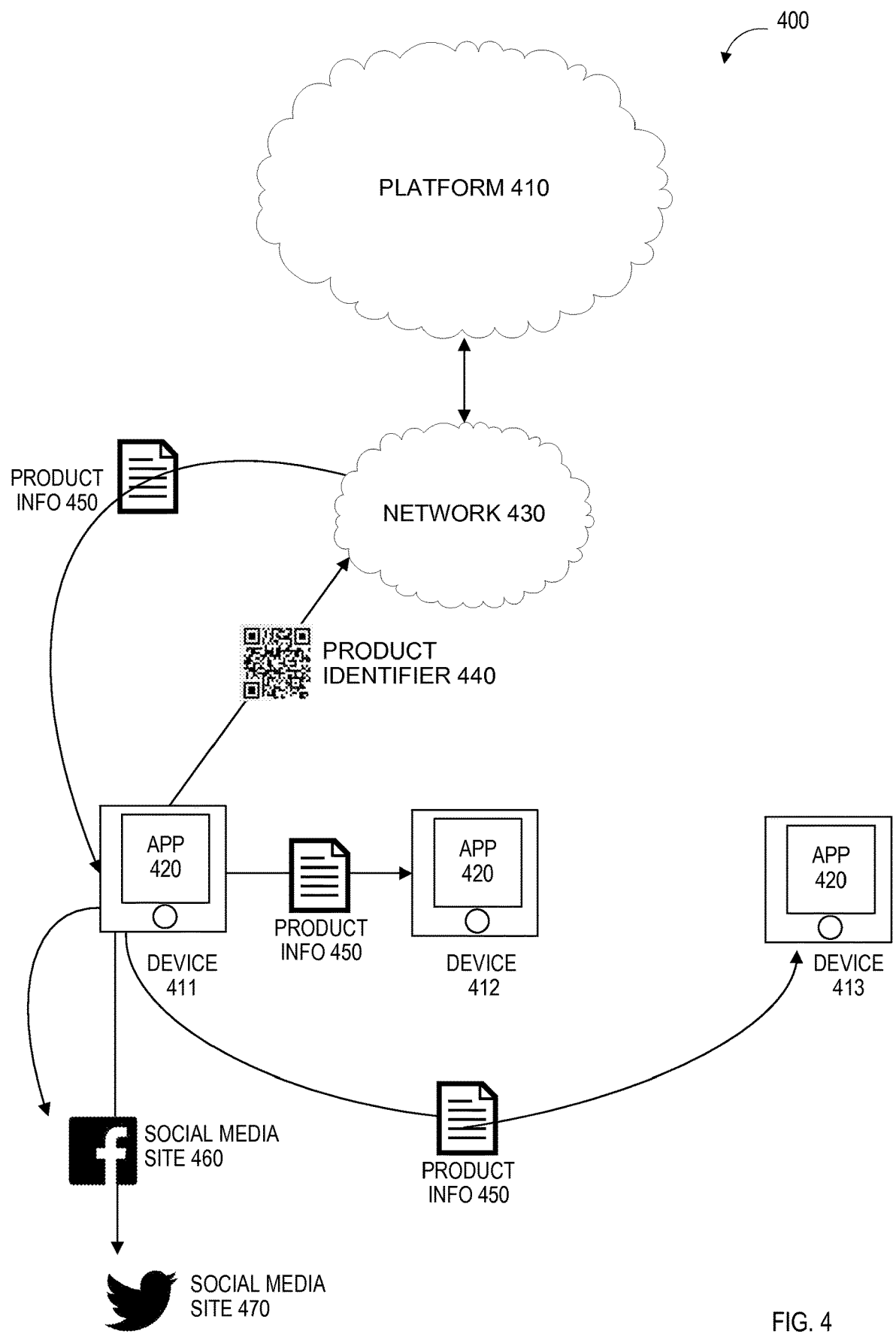
FIG. 4 is a diagram illustrating an embodiment of an environment in which product information is collected and shared.

FIG. 4 illustrates an embodiment of an Environment 400 in which product information is collected and shared. In the example shown, Alice is operating Device 411, Bob is operating Device 412, and Charlie is operating Device 413. Devices 411, 412, and 413 are all mobile devices (e.g., smartphone, tablet PC) and have each been installed with a respective copy of Application 420. In addition, all three of the devices communicate with Platform 110 via Network 430. Alice, in the example shown, has captured Product Identifier 440 using Application 420 and Product Identifier 440 was subsequently transmitted to Platform 110 via Network 430. In response, Platform 110 transmits Product Information 450 to Alice's Device 411. After viewing Product Information 450, Alice decides to share at least a portion of Product Information 450. In the example shown in FIG. 4, Alice shares Product Information 450 with Bob via email. Meanwhile, Alice also texts Product Information 450 to Charlie. Additionally, Alice can share Product Information 450 using social media channels such as Facebook and Twitter. In the example shown, Alice uses Device 420 to post Product Information 450 to Social Media Sites 460 and 470. Thus, in addition to the email and the text message, Product Information 450 is also accessible, for example to both Bob and Charlie, via Social Media Sites 460 and 470.

In some embodiments, one or more entities (e.g., retailers, manufacturers, wholesalers) that use Platform 110 to implement reward programs can vary the rewards dynamically. For instance, a retailer like ACME may wish to adjust the rewards given to data collectors in order to draw more attention to certain products (e.g., a new or a sale item), encourage certain types of data collection activities (e.g., sharing), or boost activities in certain locations or during certain time periods (e.g., weekends, back to school, black Friday). In some embodiments, Platform 110 is able to adjust the rewards given (e.g., by amount, value, type) to data collectors depending on various aspects of their data collection activities, including but not limited to the product identifier captured, the recipient of shared product information, and attendant environment data (i.e., when and where product identifiers were captured). For example, suppose that Product A is a new item that ACME wants to heavily promote. In this case, ACME can give extra reward points to data collectors for capturing Product A's QR code and for sharing information on Product A. As another example, ACME may give bonus reward points for particularly active data collectors and/or frequent data collection activities, e.g., whenever a data collector shares product information with a predetermined number of other data- and/or non-data collectors.

Figure 5:
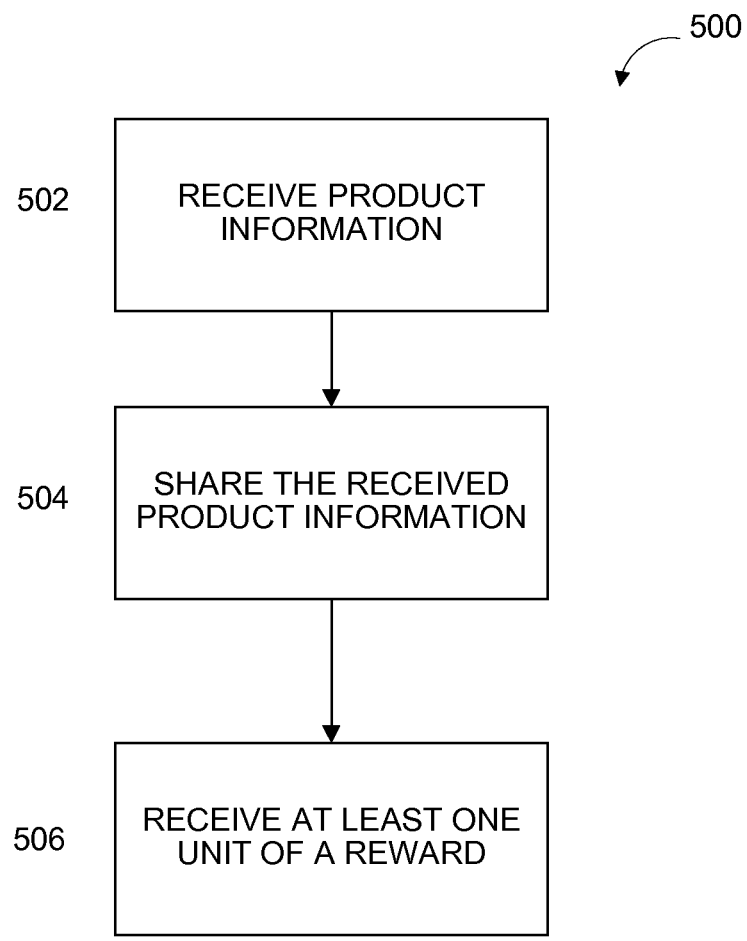
FIG. 5 is a flowchart illustrating an embodiment of a process for distributing product information.

FIG. 5 is a flowchart illustrating an embodiment of Process 500 for distributing product information. In various embodiments, product information can be distributed through data collection activities such as sharing and re-sharing of product information. In various embodiments, Process 500 is performed by a mobile device (e.g., Device 120, Devices 411-413) operated by a data collector. In various embodiments, the mobile device (e.g., Device 120, Devices 411-413) is installed with an application (e.g., Application 130, Application 420) that allows the operator of the mobile device to collect and transmit product information (e.g., Product Identifier 140, Product Identifier 440) to a remote platform (e.g., Platform 110), and to receive product information (e.g., Product Information 160, Product Information 450) from the remote platform (e.g., Platform 110) in return. In various embodiments, Process 500 is a continuation of or addition to Process 800 described with respect to FIG. 2. As such, in various embodiments, Process 500 commences at 502 where product information is received as it is received at 206 of Process 800. For example, as described earlier with respect to FIG. 4, Alice receives Product Information 450 from Platform 110 on her smartphone, Device 411, as a result of capturing Product Identifier 440.

At 504, at least a portion of the product information received at 502 is shared. In various embodiments, product information can be shared with both data collectors and non-data collectors. In the example described with respect to FIG. 4, Alice shares Product Information 450 with both another data collector (i.e., Bob) and a non-data collector (i.e., Charlie). Further described in that example, Alice is able to share Product Information 450 through any appropriate channel or means, including but not limited to email, text, IM, and social network websites. Furthermore, in various embodiments, data collectors who distribute product information are rewarded. As described above, rewards (e.g., amount, value, type) can be flexible and dynamic depending on any number of appropriate factors. Thus, at 506, at least one unit of a reward is received. In some embodiments, personal reward accounts and the rewards for individual data collectors are collectively and/or centrally managed by and stored at Platform 110. Thus, in some embodiments, a data collector is said to "receive" a reward when Platform 110 adds, credits, deposits, or otherwise records the reward to the data collector's account. Referring again to the example described with respect to FIG. 4, Alice can receive one amount, value, or type of reward for sharing Product Information 450 with Bob (a data collector) and a different amount, value, or type of reward for sharing Product Information 450 with Charlie (a non-data collector).

Figure 6:
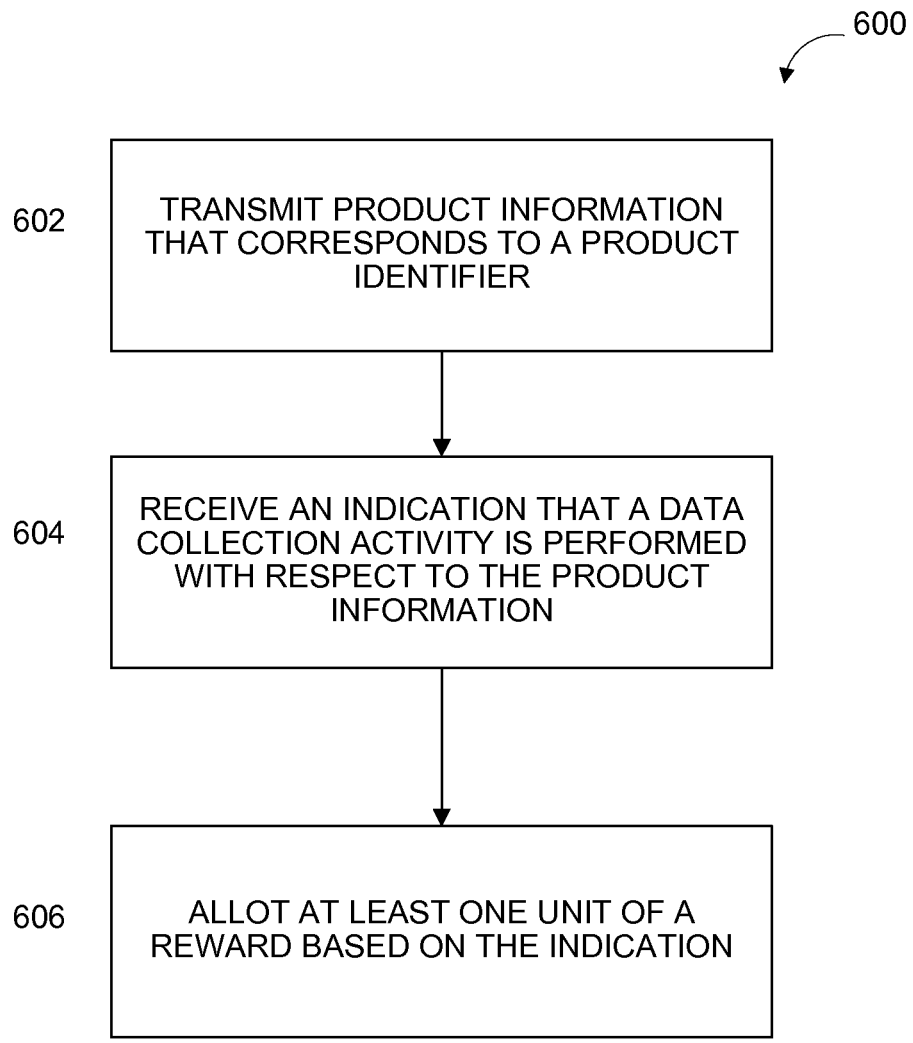
FIG. 6 is a flowchart illustrating an embodiment of a process for distributing product information.

FIG. 6 is a flowchart illustrating an embodiment of a Process 600 for distributing product information. In various embodiments, Process 600 is performed by the central platform (e.g., Platform 110). In various embodiments, Process 600 is performed in addition to and as a continuation of Process 300 described with respect to FIG. 3. In various embodiments, Process 600 commences at 602 where product information that correspond to a product identifier is transmitted such as at 306 of Process 300. As discussed earlier, Platform 110 is configured to transmit, in various embodiments, product information (e.g., Product Information 160, Product Information 450) in response to receiving a corresponding product identifier (e.g., Product Identifier 140, Product Identifier 440). Also as discussed earlier, product information (e.g., Product Information 160, Product Information 450) can include but is not limited to detailed descriptions of the corresponding merchandise, composition and material, handling and care instructions, a link to the manufacturer (e.g., a URL), related or alternative products and/or services (e.g., accessories, warranties, etc.), and promotions (e.g., coupons, rebates).

At 604, an indication is received that at least one data collection activity is performed with respect to at least a portion of the transmitted product information (e.g., Product Information 160, Product Information 450). In various embodiments, Platform 110 receives, from an application (e.g., Application 130, Application 420) installed on a data collector's device (e.g., Device 120, Devices 411-413) indication that the data collector has engaged, either directly or indirectly, in one or more data collection activities. For example, Platform 110 can receive an indication that Alice shared Product Information 450 with Bob. Although in the example described with respect to FIG. 4, Alice receives Product Information 450 directly from Platform 110, it is also possible that Alice receives Product Information 450 from another data collector, David, instead. As such, when Alice shares Product Information 450 with Bob, Platform 110 can also receive an indication that David also engaged in data collection activity as an indirect result of Alice's data collection activity since Product Information 450 originated from David and was re-shared by Alice.

In various embodiments, the application (e.g., Application 130, Application 420) includes functionalities to track and otherwise record various types of data collection activities. Furthermore, in some embodiments, when product information is shared and re-shared (e.g., from Data Collector A to B to C), the product information is modified in order to track the identities of at least some of the data collectors who has engaged in some form of data collection activity with respect to that product information. In various embodiments, the metadata associated with the product information is modified including by, for example, adding or inserting a tag or signature that uniquely identifies at least some of the instances of data collection activities (e.g., sharing and re-sharing) and/or the individual data collectors who performed the data collection activities. Consequently, in various embodiments, the application (e.g., Application 130, Application 420) can detect when a data collector shares (e.g., via email, text, social media) product information. Furthermore, in various embodiments, when a data collector receives product information from another data collector, the application (e.g., Application 130, Application 420) can also determine the source(s) of the product information, including when the product information has been shared and re-shared through a chain or sequence of data collectors. In various embodiments, the application is configured to transmit an indication to the platform of the types of direct and indirect data collection activities (e.g., sharing, re-sharing of product information) that one or more data collectors have engaged in.

At 606, at least one unit of a reward is allotted based at least in part on the indication received at 604. In the example described above, Platform 110 would allot one amount, value, or type of reward to Alice for sharing Product Information 450 with Bob. Suppose that Product Information 450 originated from David. In that case, Platform 110 would also allot a certain amount, value, or type of reward to David. As discussed earlier, since Platform 110 can vary the amount, value, or type of rewards allotted, the amount, value, or type of reward given to Alice and to David are commiserate with their respective type of data collection activity.

Incentivizing Data Collector Registration

In some embodiments, data collectors can register with the remote platform (e.g., Platform 110). The registration process, in various embodiments, includes the submission of personal information by an individual data collector. For example, in some embodiments, a user can register to become a data collector by installing the application (e.g., Application 130) or navigating to a dedicated website. In various embodiments, the user is prompted through one or more screens or webpages containing a variety of data input or submission fields. In various embodiments, the remote platform can tag or otherwise associate each product identifier captured by a data collector and the information concomitant to the capture of the product identifier (e.g., environment information) with at least some of the personal information that the data collector provides through the data collector registration process. In some embodiments, information associated with data collection activities are only associated with a specific data collector (i.e., tagged with personal information) after the remote platform has obtained one or more forms of authorization or permission from the data collector.

In one example, after Alice installs Application 130 on Device 120, she may agree to register with Platform 110 and then be prompted to input a user identifier (e.g., username), a password, and a variety of personal information (e.g., birthdate, address, age, profession). In some embodiments, Platform 110 can facilitate the registration process through existing accounts that data collectors have established with a third party, such as a social network site or an Internet vendor (e.g., Google+, Facebook, Twitter, Amazon, Pinterest, Tumbler). In some embodiments, the information collected as part of the registration process is also used to customize and to refine the services and features provided by Platform 110. For example, Platform 110 can use the information to segment data collectors demographically (e.g., by age, gender) and tailor the rewards programs accordingly.

In some embodiments, data collectors are not required to register with Platform 110 in order to engage in any data collection activities. For instance, Alice can use Application 130 to capture product identifiers, and to receive and share product information without having registered with Platform 110. In various embodiments, where a captured product identifier originates from an unregistered data collector, the product identifier and any attendant information can be associated with an automatically generated or a default identifier. As one example, Platform 110 can associate the information with the unregistered data collector's mobile device (e.g., the mobile device's International Mobile Equipment Identity, etc.) or IP address. Alternately or in addition, Platform 110 can associate information from an unregistered data collector with a group account (e.g., a designated "Unregistered Data Collector" account).

Nevertheless, in various embodiments, Platform 110 is configured to implement programs that encourage or incentivize data collectors to complete the data collector registration process. In some embodiments, only registered data collectors are able to earn rewards for their data collection activities. In some embodiments, only registered data collectors are able to use or redeem accrued reward. Alternately or in addition, in other embodiments, Platform 110 can offer registered data collectors more reward points and/or more opportunities to earn reward points. Further still, in some embodiments, Platform 110 can be configured to provide registered data collectors with exclusive benefits and features, including personalized services that are not available to unregistered data collectors.

For example, in one embodiment, Platform 110 allows registered data collectors to create bespoke tags (e.g., personal QR codes) that can be linked to a wide variety of information (e.g., contact, website URL, resume/curriculum vitae, and gift registry). In various embodiments, Application 130 can provide a graphic user interface (GUI) that allows registered data collectors to initiate, request, or otherwise select a service, a feature, or a benefit. In some embodiments, the GUI can include various control components or elements (e.g., buttons, check boxes, or radio buttons) that correspond to the different services, features, and benefits offered by Platform 110 and which are available only to registered data collectors. In some embodiments, the GUI can alternately or additionally include a dropdown menu that reveals the exclusive selection of services, features, and benefits. In various embodiments, an unregistered user is able to see but cannot actually access any of the exclusive services, features, and benefits. For example, when an unregistered data collector launches Application 130, the unregistered data collector sees grayed-out versions of the buttons and/or the dropdown menu.

In some embodiments, one of the exclusive features, services, or benefits that are available only to registered data collectors is "Create QR Code," which enables users to create bespoke QR codes that stores or links to personalized or custom content. Suppose that Alice is a registered data collector. In some embodiments, Alice can take advantage of this exclusive "Create QR Code" feature by first selecting the feature through, for example, a corresponding button or from a dropdown menu. After making her selection, Alice can then create QR codes that stores or links to a variety of personalized and/or custom content, including but not limited to contact information, resume or curriculum vitae, and gift registry.

In some embodiments, selection of the "Create QR Code" feature launches one or more mechanisms to input personalized or custom content. For example, in some embodiments, after Alice selects the "Create QR Code," Alice is presented with a text editor to manually input the personalized or custom content (e.g., contact information). Alternately or in addition, Alice can be presented with a mechanism to upload the personalized or custom content (e.g., a resume or CV file). In some embodiments, after the registered data collector completes inputting personalized or custom content, a unique content identifier (e.g., a bespoke QR code) is generated. In some embodiments, the unique content identifier can be generated based on some or all of the personalized or custom content. It is to be understood that Platform 110 can store at least a portion of the personalized or custom content associated with a unique content identifier. Simultaneously or alternately, it is also to be understood that some or all of the personalized or custom content can be encoded in the bespoke QR code. In various embodiments, a bespoke QR code can contain at least some personalized or custom content but it can also contain, instead or in addition, links to the personalized or custom content stored at Platform 110.

Advantageously, a unique content identifier that incorporates and/or links to personalized or custom content (e.g., a bespoke QR code) lends portability and accessibility to diverse and voluminous amounts of personalized or custom content. For example, in various embodiments, a registered data collector like Alice can share and otherwise disseminate personalized or custom content by simply distributing a bespoke QR code. In this manner, Alice is able to share her personalized and custom content with virtually anyone (e.g., friends, colleagues, potential employer, etc.) and via any appropriate channel or means (e.g., email, SMS, social network, hard copies, etc.). Furthermore, recipients of a bespoke QR code can easily access the personalized and custom content. In particular, in various embodiments, Application 130 offers a range of functionalities to read and to otherwise decode bespoke QR codes, particularly those that were generated using the "Create QR Code" feature. For example, suppose Alice sends Bob a bespoke QR code that contains or links to her contact information and further suppose that Bob has installed Application 130 on his smartphone. In various embodiments, Bob can gain access to Alice's contact information by capturing Alice's bespoke QR code using Application 130 in a similar fashion to capturing (e.g., photographing, scanning) a product identifier (e.g., Product Identifier 140). In some embodiments, Application 130 can decode Alice's bespoke QR code to extract, retrieve, and otherwise obtain the personalized or custom content associated with the bespoke QR code. In various embodiments, decoding a bespoke QR code includes reading the personalized or custom content that is directly stored in the QR code. In various embodiments, decoding a bespoke QR code can include, instead or in addition, locating and/or identifying, at Platform 110, personalized or custom content that is associated with the bespoke QR code. Finally, Application 130 can deliver the extracted, retrieved, and otherwise obtained personalized or custom content (e.g., Alice's contact information) to Bob, including by, as one example, displaying the personalized or custom content to Bob directly on his smartphone.

In some embodiments, another exclusive feature, service, or benefit of registration is that registered data collectors can use Application 130 to perform self-checkouts in brick-and-mortar retail locations. That is, in some embodiments, registered data collectors can complete their purchases using any mobile device (e.g., Device 120) installed with a copy of Application 130. Advantageously, in various embodiments, the self-checkout feature alleviates the "bottleneck" typically found at conventional cash-wrap counters and registers. In various embodiments, registered data collectors can use Application 130 to checkout instantly and on-the-spot, while bypassing the wait and hassle of a manual checkout.

In one exemplary embodiment, a registered data collector can use a mobile device (e.g., Device 120) to capture the product identifiers of one or more products that the registered data collector is interested in purchasing. In some embodiments, the registered data collector can launch Application 130 and select the "Checkout" feature. Subsequently, in various embodiments, Application 130 processes the captured product identifiers to determine a total price for the purchase. In various embodiments, determining the total cost for the purchase includes making adjustments for any available, selected, or appropriate discounts and offers (e.g., redeemed reward points). In various embodiments, the registered data collector is able to pay for the purchase using Application 130 directly. For example, in one embodiment, Application 130 gives the registered data collector an option to save, ahead of time, one or more forms of payment (e.g., credit card, debit card, bank account, PayPal® account, gift vouchers). In some embodiments, the registered data collector can also choose to enter payment information on-the-spot with or without saving that information for subsequent use. In some embodiments, the registered data collector can enter the payment information by manually entering the relevant data (e.g., input using a keyboard furnished by the mobile device). However, in other embodiments where it is appropriate to do so, Application 130 can obtain the payment information electronically such as through a mobile credit card or magnetic stripe reader (e.g., UniMag or UniPay manufactured by ID Tech Corporation of Cypress, Calif.). Alternately or in addition, in some embodiments, Application 130 is integrated with or is otherwise configured to interact with a virtual or electronic wallet (e.g., Google Wallet™). As such, in various embodiments, once Application 130 determines the total price for the purchase, the registered user can choose to pay for the purchase using any desired or appropriate form of payment, including but not limited to a credit card, debit card, bank account, PayPal®, gift vouchers, or an integrated electronic or virtual wallet.

As one illustrative example, after perusing the ACME store and engaging in several data collection activities (e.g., capturing product identifiers, sharing product information), Alice eventually decides to purchase three items but is loath to queue at a busy cash register. Alice, fortunately, is a registered data collector. Thus, in various embodiments, Alice is able to avoid the checkout line by using the self-checkout feature provided by Application 130. For example, in some embodiments, the GUI for Application 130 can include a control element or component that activates the self-checkout feature (e.g., a "Checkout" button). In various embodiments, after selecting the feature, Alice can then capture (e.g., scan, photograph) each corresponding product identifier using Application 130. Once Alice has completed scanning her items, in various embodiments, she can select one or more other GUI control components or elements (e.g., a "Pay" button) to generate her purchase total and to display her payment options. In various embodiments, once Alice has indicated that she has scanned all her items, Application 130 is configured to determine a total amount that Alice owes for purchasing her three items. In some embodiments, Application 130 adjusts the purchase total based on discounts and offers, including any data collection reward points that Alice elects to redeem. In various embodiments, Application 130 then displays purchase total (e.g., $100) as well as one or more payment options available to Alice. In various embodiments, Alice can enter a new form of payment or select any previously saved forms of payment. In various embodiments, Alice can choose to pay for her purchase using any desired or appropriate form of payment, including but not limited to a credit card, debit card, bank account, PayPal® account, gift vouchers, or an integrated electronic or virtual wallet.

In some embodiments, another one of the exclusive features, services, or benefits that are available only to registered data collectors is "Create Registry," which can be accessed via a corresponding button or as dropdown menu selection. In various embodiments, registered data collectors can use Application 130 to create personalized or custom gift registries. In various embodiments, the gift registry is created over a period of time as the registered data collector engages in various data collection activities, including but not limited to capturing product identifiers, and receiving product information shared by other registered or non-registered data collectors. For example, after capturing (e.g., photographing, scanning) a product identifier (e.g., Product Identifier 140), Alice has the option to add that product identifier and/or at least a portion of the corresponding product information to her personal gift registry. Alice also has the option to add to her gift registry product information (or corresponding product identifiers) shared by other data collectors. In some embodiments, Platform 110 can be configured to give additional reward points to a data collector (registered or non-registered) for sharing product information on products that are then added to another registered data collector's gift registry.

Data Collection and Distribution

In various embodiments, Device 120 includes an image capturing device such as a camera that allows a data collector to capture individual product identifiers. In various embodiments, Product Identifier 140 can be a barcode, a QR code, and or images of the products, product descriptions, and product advertisements. In some embodiments, a captured product identifier is transmitted to Platform 110 in a raw and unprocessed form (e.g., an image of a barcode, an image of a product). In some embodiments, Application 130 is configured to process Product Identifier 140 and to transmit Product Identifier 140 to Platform 110 in a processed form. For example, the captured product identifier can be processed to distill the underlying product code associated with the barcode or the QR code. Alternately, the captured product identifier can be processed in order to extract the metadata associated with the product image. Other types of data can also be obtained through processing the captured product identifier including data from facial recognition and optical character recognition. In some embodiments, in addition to Platform 110 storing some or a portion of Product Identifier 140 and the attendant information (e.g., personal and/or environment information), Device 120 is also configured to store at least a portion of the same information.

In some embodiments, in addition to a product identifier and any concomitant information (e.g., personal and/or environment information), a data collector can input additional information relating to the data. For example, in conjunction with capturing Product Identifier 140 and receiving Product Information 160, Alice can provide her own input, including a narrative regarding the corresponding product (e.g., a description, a review) and the actual retail location (e.g., ACME) where she found the product. In some embodiments, in addition to or instead of a narrative, the data collector can provide multimedia data, such as still images, audio recordings, or video recordings. In some embodiments, additional information provided by individual data collectors is stored locally, such as at Device 120, and is available only for private consumption. In some embodiments, at least some of the additional information (e.g., narratives, audio/video recordings, still images) can be transmitted to and stored at Platform 110. In some embodiments, Platform 110 is configured to integrate some or all of the additional information furnished by different data collectors into publicly available product information, such as Product Information 160. For example, Product Information 160 can include consumer reviews, at least some of which originate as additional information input by different data collectors. In some embodiments, Platform 110 is configured to obtain a release agreement or any other appropriate type of authorization or permission from a data collector before uploading the additional information and/or making the additional information publicly available.

In various embodiments, Application 130 is configured to record concomitant information that accompanies and/or is relevant to the capture or Product Identifier 140. Examples of this concomitant information include, in various embodiments, location information, date and time, social statistics (e.g., nearby data collectors), and any other types of environment information. In various embodiments, Application 130 is able to record various different types and granularities of location information, including but not limited to Internet traffic information (e.g., IP address of Device 120) and device-based location services (e.g., GPS, WiFi access points, cell tower identification). In some embodiments, Application 130 can be configured to automatically record certain types of concomitant information (e.g., date and time). In some embodiments, Application 130 is only allowed to record at least some types of concomitant information (e.g., location) subject to a data collector's permission or consent.

Subject to each data collector's permission or consent, in various embodiments, Platform 110 receives and aggregates information that is concomitant to the capture of many different product identifiers by a large community of data collectors. Further subject to each data collector's permission or consent, in some embodiments, Platform 110 stores the concomitant information along with one or more forms of personally identifiable data (e.g., name, address, email, data collector identifier) that links, relates, or otherwise associates concomitant information to individual data-collectors and/or specific data collection instances or events. Alternately, in some embodiments, Platform 110 can store the concomitant information absent any personally identifiable data that is specific to any one data collector. For example, in some embodiments, Platform 110 can store Product Identifier 140 with only a corresponding timestamp and location data to reflect when and where Product Identifier 140 was captured. Meanwhile, Platform 110 will not store any personal identification data, such as a name, address, email, and/or data collector identifier, that would link the stored data (i.e., Product Identifier 140) to the individual data collector who captured the data in that specific instance.

As discussed earlier (e.g., with respect to FIG. 1), Platform 110 is configured to transmit Product Information 160 to Device 120 in response to receiving Product Identifier 140 from Device 120. Advantageously, Product Information 160 can include copious and detailed product information that may be infeasible or undesirable to be displayed on or alongside a product. In some embodiments, Product Information 160 can include product information that is traditionally found only inside product packaging (e.g., instructions, manuals) and is not accessible without first purchasing the product. In various embodiments, Product Information 160 can include detailed descriptions of the corresponding merchandise, composition and material, handling and care instructions, a link to the manufacturer (e.g., a URL), related or alternative products and/or services (e.g., accessories, warranties, etc.), and promotions (e.g., coupons, rebates).

In some embodiments, receipt of Product Identifier 140 at Platform 110 triggers the compilation of any and all product information that is germane and otherwise related to the product corresponding to Product Identifier 140. In various embodiments, Platform 110 can search for, obtain, and compile all relevant and available product information, including but not limited to published articles, and professional and amateur reviews (e.g., text, audio, and video). In various embodiments, Platform 110 can utilize a variety of resources to locate and obtain product information, including but not limited to as Internet search engines (e.g., Google®, Bing®), video sharing websites (e.g., YouTube®), visual discovery tool (e.g., Pinterest®), social networks (e.g., Facebook®, Twitter®), ecommerce websites (e.g., Amazon®), news websites (e.g., CNN®, Reuters®), and review sites (e.g., Yelp®, Edmunds®). In various embodiments, Platform 110 is configured to deliver at least a portion of the compiled information to the data collector who captured Product Identifier 140. Due to the breadth of the compiled product information, it is very likely to include material that some entities (e.g., vendors, manufacturers, retailers) find inappropriate, offensive, and/or undesirable for distribution to one or more data collectors. Thus, in various embodiments, Platform 110 can be configured to edit, filter, and otherwise process the compiled product information to remove any inappropriate, offensive, and/or undesirable product information. In various embodiments, Platform 110 can "sanitize" (e.g., edit, filer) compiled product information to generate Product Information 160, which is then delivered to Device 120. In some embodiments, Platform 110 can offer "sanitization" as a paid feature or service. For example, an entity (e.g., a vendor, manufacturer, retailer) can pay a fee (e.g., fixed, flexible, or dynamically determined) in order to remove material (e.g., an offensive review) from the compiled product information. In various embodiments, the degree, extent, and granularity of the sanitization performed by Platform 110 can be customized. In various embodiments, the fee or cost associated with the sanitization service can vary based on the degree, extent, and granularity of the sanitization required by an individual entity. An entity that subscribes to the sanitization service can, in various embodiments, stipulate various sanitization parameters, including but not limited to the types of material to sanitize (e.g., edit or filter amateur but not professional reviews), sources to sanitize (e.g., edit or filter only material from specific websites or types of websites), black or whitelist of keywords (e.g., edit or filter material that do or do not contain one or more keywords), etc.

Data Subscription

In various embodiments, Platform 110 is configured to receive and to store a variety of information from different data collectors, including by not limited to captured product identifiers (e.g., Product Identifier 140), information that is concomitant to the capture of the product identifiers (e.g., data collector and environment information), and social information relating to a panoply of ensuing or consequent data collection activities (e.g., sharing and re-sharing of product information). In various embodiments, Platform 110 processes at least some of the information from different data collectors. In various embodiments, Platform 110 processes at least some of the information from data collectors by applying one or more statistical analysis techniques to the information, including but not limited to extrapolating, interpolating, averaging, and/or segmenting the information. As one example, Platform 110 can segment the data from different data collectors along a variety of dimensions, including but not limited to product, product type or product line, date and time of capture, location of capture, data collector demographics, etc.

As discussed earlier, an entity (e.g., a manufacturer, wholesaler, retailer, designer, government agency, university, and advertiser) can become a data subscriber and gain access to some or all of the information (processed and/or unprocessed) that Platform 110 receives from various data collectors. In various embodiments, Platform 110 provides access to information from data collectors as a fee-based service or feature. Otherwise stated, in various embodiments, a data subscriber pays a fee (e.g., fixed, flexible, dynamically determined) to have access to some or all of the raw and/or processed data Platform 110 receives from various data collectors. In various embodiments, data subscription fees can depend on factors such as the amount of data collector information, the frequency of updates, and the types of processing required by each individual data subscriber.

In some embodiments, processing the information from data collectors can further include packaging the information based on one or more criteria, filters, or dimensions. For example, in some embodiments, Platform 110 can package the information from data collectors based on demographics, including but not limited to geographical region, age, gender, religion, and education. As such, instead of subscribing to receive all data collector information, data collectors have, in some embodiments, the option to subscribe to receive specific packages of data that pertain to only certain demographic groups of data collectors. ACME, for instance, can subscribe to information that comes from data collectors who are female, college-educated, and between the ages of 25-34.

In various embodiments, Platform 110 can also, in addition or instead, package information from various data collectors based on the products associated with the captured product identifiers, including but not limited to the product types, features, and characteristics. In some embodiments, Platform 110 can process (e.g., segment, filter) the information from different collectors in order to track consumer interests in or affinity towards, for example, specific products, types of products, categories of products, or products having certain characteristics. In embodiments where Platform 110 processes information from different data collectors along multiple dimensions, the information can be segmented and packaged in order to track product interest and affinity amongst different demographic groups (e.g., age, gender, ethnicity, education) of consumers. It is to be understood that Platform 110 is capable of applying or performing any appropriate types of data processing and statistical analysis techniques.

Advantageously, the various embodiments of the systems and methods described herein provide data subscribers with access to data collector information that lends tremendous insight into consumer behavior. In various embodiments, the information from different data collectors can be analyzed for trends, projections, and other crucial indicators in key aspects of sales, branding, and merchandising such as product demand and price preferences. In particular, the information that Platform 110 receives from different data collectors in the various embodiments described herein can be used to quantify, qualify, encapsulate, model, and otherwise capture real life consumer behavior including how consumers interact with products in a brick-and-mortar retail environment. For example, in various embodiments, Platform 110 can analyze some or all of the information received from different data collectors to identify certain key data collectors. In various embodiments, Platform 110 can identify, for example, data collectors who most actively engage in and/or stimulate data collection activities (e.g., most number of captured product identifiers, most number of shares, most number of re-shares, etc.) and data collectors who are most likely to generate sales activities through his or her data collection activities. In various embodiments, Platform 110 can also be configured to identify key product identifiers and/or the corresponding products by analyzing some or all of the information received from different data collectors. For instance, Platform 110 can identify "popular" products, including but not limited to items that are associated with the most instances of data collection activities (e.g., shared and re-shared most frequently) and items that are most likely to be purchased as a result of data collection activities.

In some embodiments, Platform 110 can process information received from data collectors according to geographic parameters, including but not limited the geographical location of the data collectors and the geographical location of where each product identifier was captured (e.g., photographed, scanned). For example, Platform 110 can group or classify information from different data collectors according to the city and state where each data collector lives in. As another example, Platform 110 can group or classify information from different data collectors based on the city and state where each product identifier was captured. In some embodiments, Platform 110 is further able to present information that has been processed according to geographic parameters in a geographical display, such as a map. For example, information from data collectors that have been grouped or classified based on the city and state where each product identifier was captured can be displayed on a map of the United States. In various embodiments, Platform 110 can use different graphical indicators (e.g., colors, symbols) to reflect different data collection activity metrics (e.g., volume of data collection activities) for each city and state. In various embodiments, a data subscriber can refine the amount, scope, or scale of the displayed data collector information. That is, in some embodiments, a data subscriber can dynamically change or limit the amount, scope, or scale of data collector information displayed at once by, for example, confining the display to certain geographical regions (e.g., only cities in California, only cities in North England states, etc.).

Figure 7:
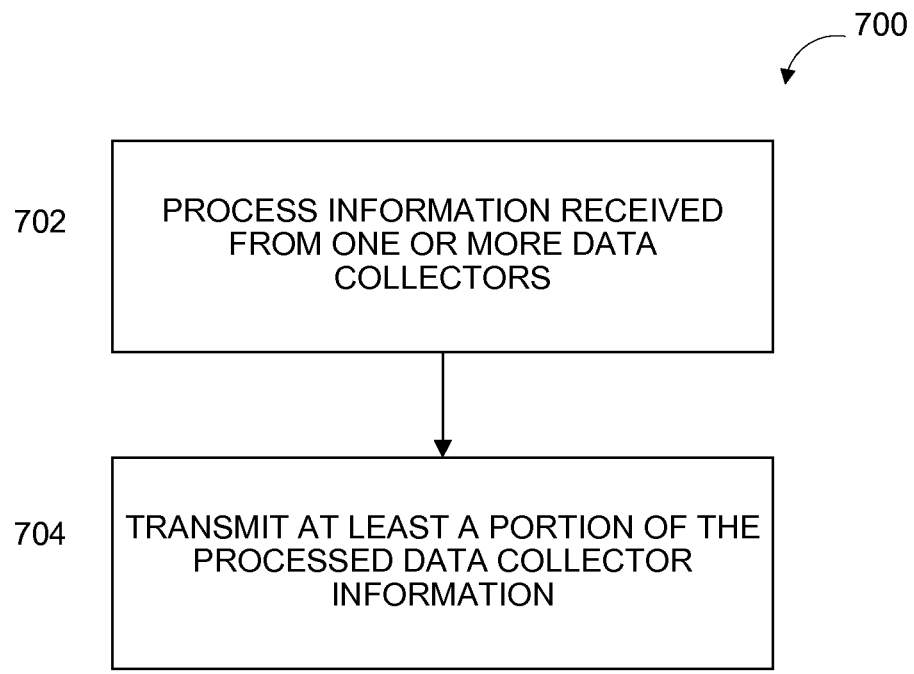
FIG. 7 is a flowchart illustrating an embodiment of a process for data subscription.

FIG. 7 is a flowchart illustrating an embodiment of a Process 700 for data subscription. In various embodiments, Process 700 is performed by a remote platform such as Platform 110. As discussed earlier, Platform 110 is configured to receive a variety of information from a multitude of data collectors, including but not limited to captured product identifiers (e.g., Product Identifier 140), information that is concomitant to the capture of the product identifiers (e.g., personal and environment information), and social information relating to ensuing or consequent data collection activities (e.g., sharing and re-sharing of product information). At 702, at least a portion of the information received from one or more data collectors is processed. In various embodiments, Platform 110 is configured to process information from data collectors using one or more data processing and statistical analysis techniques. In various embodiments, Platform 110 is capable of processing information from data collectors (e.g., segment, package) according to different parameters and along a variety of dimensions, including by not limited to geography, product characteristics, and data collector demographics. At 704, at least a portion of the information processed at 702 is transmitted to a data subscriber. In various embodiments, Platform 110 is configured to transmit only a specific portion (e.g., selective packages) of the processed data to a data subscriber. In various embodiments, individual data subscribers can change, update, and otherwise vary the amount, content, and/or scope of their data subscriptions. For example, in some embodiments, a data subscriber controls the amount and type of data collector information Platform 110 transmits to the data subscriber. In addition, in some embodiments, the data subscriber can further dictate the types and/or extent of processing performed by Platform 110 on the data collector information transmitted to the data collector as well as the frequency with which Platform 110 transmits data collector information to the data subscriber.

Furthermore, in various embodiments, transmitting data collector information to a data subscriber (as in described with respect to FIG. 7) can include displaying or otherwise visually rendering the data collector information. In some embodiments, Platform 110 can vary, adjust, or otherwise modify the display of individual pieces or groups of information received from data collectors in order to visually emphasize or distinguish these pieces or groups of information. In some embodiments, certain pieces or groups of information can be displayed differently (e.g., different colors, highlighting, symbols, etc.) in order to reflect disparities in the information. For example, Platform 110 can highlight information from data collectors that include at least some negative feedback, such as when a data collector inputs a negative review for a product in conjunction with capturing a product identifier. Alternately, as another example, Platform 110 can vary the display of information from data collectors only after a certain threshold has been reached or exceeded. To continue the earlier example, Platform 110 can begin displaying negative information from data collector differently (e.g., different colors, highlighting, symbols, etc.) only after a predetermined number (e.g., greater than 50) of negative inputs or feedback (e.g., comments, reviews) have been received with respect to a particular product. Finally, Platform 110 can vary, adjust, or otherwise modify the display of data collector information in order to reflect relative differences in the information. For example, in embodiments where data collector information is displayed geographically (e.g., on a map), areas (e.g., cities, states, regions) can be displayed in different colors or different intensities of the same color depending on the number of negative data collector information received from each area.

Mobile Devices

Figure 8:
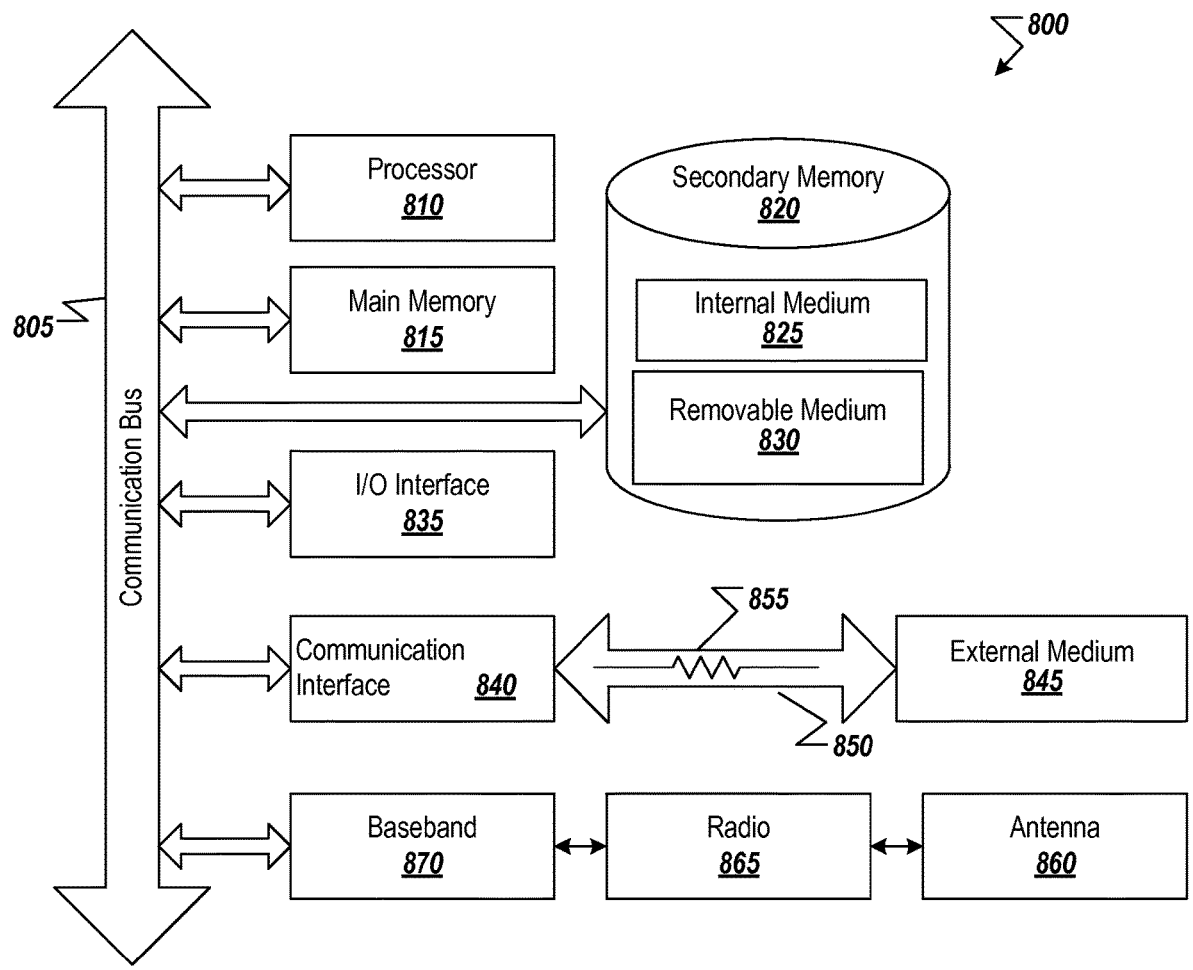
FIG. 8 is a diagram illustrating a mobile device that is suitable for use in some embodiments of the systems and methods described herein.

FIG. 8 illustrates a Device 800 that is suitable for use in some embodiments of the systems and methods described herein. For example, in some embodiments, Device 800 can be used to implement Device 120, which is described with respect to FIG. 1, and some or all of Devices 411-413, which are described with respect to FIG. 4. In various embodiments, Device 800 can be used as is or in conjunction with one or more of the mechanisms or processes described above, and can represent components of server(s), user system(s), and/or other devices described herein. Device 800 can be a server or any conventional personal computer, or any other processor-enabled device that is capable of wired or wireless data communication. Other computer systems and/or architectures can be also used, as will be clear to those skilled in the art.

Device 800 preferably includes one or more processors, such as Processor 810. Additional processors can be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors can be discrete processors or can be integrated with the Processor 810. Examples of processors which can be used with Device 800 include, without limitation, the Pentium® processor, Core i7® processor, and Xeon® processor, all of which are available from Intel Corporation of Santa Clara, California.

Processor 810 is preferably connected to a Communication Bus 805. Communication Bus 805 can include a data channel for facilitating information transfer between storage and other peripheral components of the Device 800. Communication Bus 805 further can provide a set of signals used for communication with the Processor 810, including a data bus, address bus, and control bus (not shown). The Communication Bus 805 can comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

Device 800 preferably includes a Main Memory 815 and can also include a Secondary Memory 820. Main Memory 815 provides storage of instructions and data for programs executing on the Processor 810, such as one or more of the functions and/or modules discussed above. It should be understood that programs stored in the memory and executed by Processor 810 can be written and/or compiled according to any suitable language, including without limitation C/C++, Java, JavaScript, Pearl, Visual Basic, .NET, and the like. Main Memory 815 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary Memory 820 can optionally include an Internal Medium 825 and/or a Removable Storage Medium 430, for example a floppy disk drive, a magnetic tape drive, a compact disc (CD) drive, a digital versatile disc (DVD) drive, other optical drive, a flash memory drive, etc. Removable Storage Medium 430 is read from and/or written to in a well-known manner. Removable Storage Medium 430 can be, for example, a floppy disk, magnetic tape, CD, DVD, SD card, etc.

Removable Storage Medium 430 can be a non-transitory computer-readable medium having stored thereon computer executable code (i.e., software) and/or data (e.g., for implementing at least a portion of the subject matter described herein). The computer software or data stored on the Removable Storage Medium 430 is read into the Device 800 for execution by the Processor 810.

In alternative embodiments, Secondary Memory 820 can include other similar means for allowing computer programs or other data or instructions to be loaded into the Device 800. Such means can include, for example, an External Storage Medium 445 and an Interface 440. Examples of External Storage Medium 445 can include an external hard disk drive or an external optical drive, or and external magneto-optical drive.

Other examples of Secondary Memory 820 can include semiconductor-based memory such as programmable read-only memory (PROM), erasable programmable read-only memory (EPROM), electrically erasable read-only memory (EEPROM), or flash memory (block oriented memory similar to EEPROM). Also included are any other Removable Storage Media 430 and Communication Interface 840, which allow software and data to be transferred from an External Medium 845 to the Device 800.

Device 800 can include a Communication Interface 840. Communication Interface 840 allows software and data to be transferred between Device 800 and external devices (e.g. printers), networks, or information sources. For example, computer software or executable code can be transferred to Device 800 from a network server via Communication Interface 840. Examples of Communication Interface 840 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing Device 800 with a network or another computing device.

Communication Interface 840 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but can also implement customized or non-standard interface protocols as well.

Software and data transferred via Communication Interface 840 are generally in the form of electrical communication Signals 855. Signals 855 are preferably provided to Communication Interface 840 via a Communication Channel 850. In one embodiment, Communication Channel 850 can be a wired or wireless network, or any variety of other communication links. Communication Channel 850 carries Signals 855 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the Main Memory 815 and/or the Secondary Memory 820. Computer programs can also be received via Communication Interface 840 and stored in the Main Memory 815 and/or the Secondary Memory 820. Such computer programs, when executed, enable the Device 800 to perform the various functions, such as those described herein.

In this description, the term "computer readable medium" is used to refer to any non-transitory computer readable storage media used to provide computer executable code (e.g., software and computer programs) to the Device 800. Examples of these media include Main Memory 815, Secondary Memory 820 (including Internal Medium 825, Removable Medium 830, and External Storage Medium 445), and any peripheral device communicatively coupled with Communication Interface 840 (including a network information server or other network device). These non-transitory computer readable mediums are means for providing executable code, programming instructions, and software to the Device 800.

In an embodiment that is implemented using software, the software can be stored on a computer readable medium and loaded into the Device 800 by way of Removable Medium 830, I/O Interface 835, or Communication Interface 840. In such an embodiment, the software is loaded into the Device 800 in the form of electrical communication Signals 855. The software, when executed by the Processor 810, preferably causes the Processor 810 to perform the inventive features and functions previously described herein.

In an embodiment, I/O Interface 835 provides an interface between one or more components of Device 800 and one or more input and/or output devices. Example input devices include, without limitation, keyboards, touch screens or other touch-sensitive devices, biometric sensing devices, computer mice, trackballs, pen-based pointing devices, camera, microphone, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

Device 800 also includes optional wireless communication components that facilitate wireless communication over a voice and over a data network. The wireless communication components can comprise an Antenna System 860, a Radio System 865, a Baseband System 870, or any combination thereof. In Device 800, radio frequency (RF) signals are transmitted and received over the air by Antenna System 860 under the management of Radio System 865.

In one embodiment, Antenna System 860 can comprise one or more antennae and one or more multiplexors (not shown) that perform a switching function to provide the Antenna System 860 with transmit and receive signal paths. In the receive path, received RF signals can be coupled from a multiplexor to a low noise amplifier (not shown) that amplifies the received RF signal and sends the amplified signal to Radio System 865.

In alternative embodiments, Radio System 865 can comprise one or more radios that are configured to communicate over various frequencies. In one embodiment, Radio System 865 can combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the Radio System 865 to the Baseband System 870.

If the received signal contains audio information, Baseband System 870 decodes the signal and converts it to an analog signal. Then the signal is amplified and sent to a speaker. Baseband System 870 also receives analog audio signals from a microphone. These analog audio signals are converted to digital signals and encoded by the Baseband System 870. Baseband System 870 also codes the digital signals for transmission and generates a baseband transmit audio signal that is routed to the modulator portion of the Radio System 865. The modulator mixes the baseband transmit audio signal with an RF carrier signal generating an RF transmit signal that is routed to the antenna system and can pass through a power amplifier (not shown). The power amplifier amplifies the RF transmit signal and routes it to the Antenna System 860 where the signal is switched to the antenna port for transmission.

Baseband System 870 is also communicatively coupled with Processor 810. Processor 810 has access to Main Memory 815 and Secondary Memory 820. Processor 810 is preferably configured to execute instructions (i.e., computer programs or software) that can be stored in Main Memory 815 or Secondary Memory 820. Computer programs can also be received from Baseband Processor 860 and stored in Main Memory 815 or in Secondary Memory 820, or executed upon receipt. Such computer programs, when executed, enable Device 800 to perform the various functions, such as those described herein. For example, Main Memory 815 and Secondary Memory 820 can each include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Computing Devices

Figure 9:
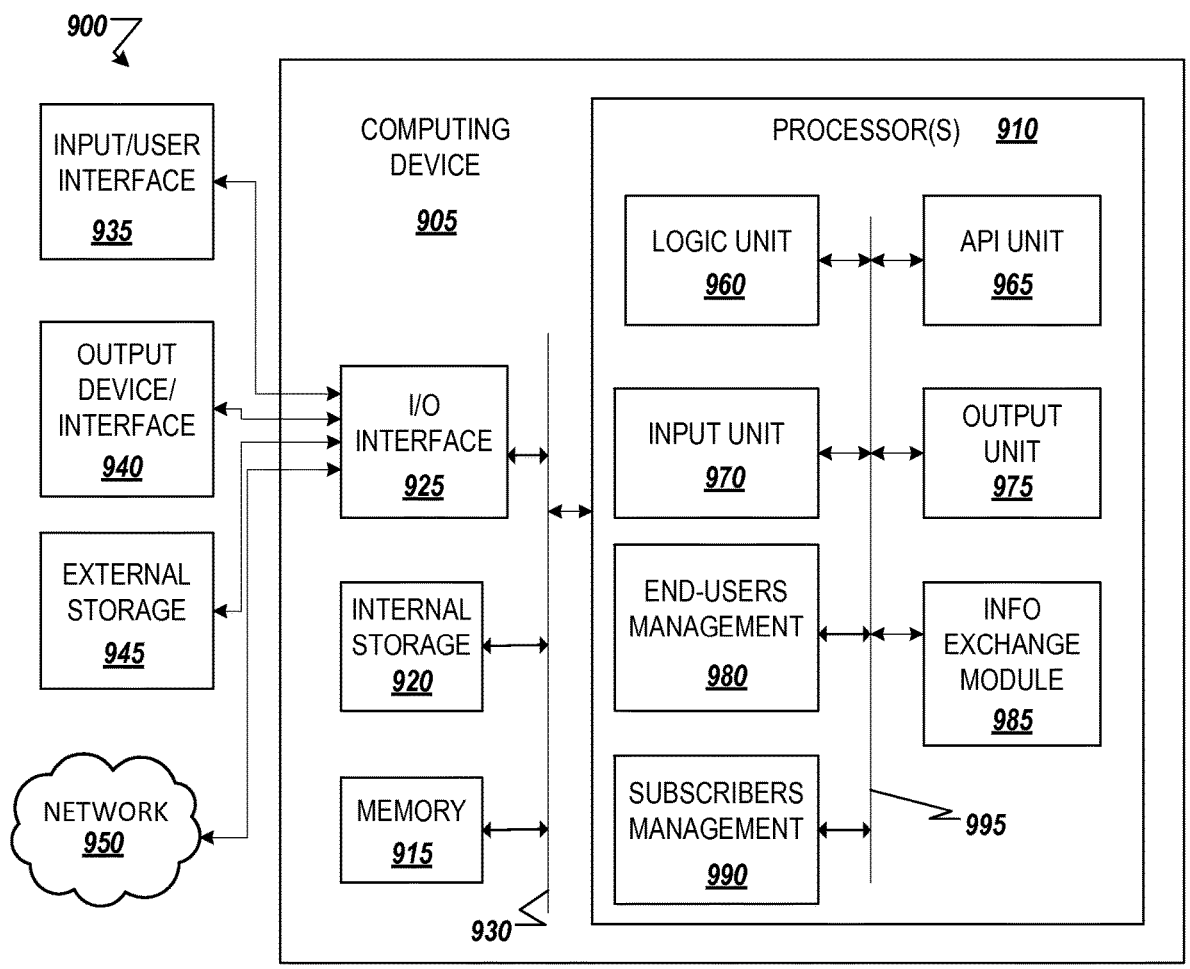
FIG. 9 is a diagram illustrating a computing environment including a computing device that is suitable for use in some embodiments of the systems and methods described herein.

FIG. 9 illustrates a Computing Environment 900 including a Computing Device 905 (e.g., servers) that is suitable for use in some embodiments of the systems and methods described herein. One or more Computing Device 905 can be used to implement Platform 110 and Systems 181 and 182, which were described with respect to FIG. 1. Computing Device 905 in Computing Environment 900 can include one or more processing units, cores, or Processors 910, Memory 915 (e.g., RAM, ROM, and/or the like), Internal Storage 920 (e.g., magnetic, optical, solid state storage, and/or organic), and/or I/O Interface 925, any of which can be coupled on a communication mechanism or Bus 930 for communicating information or embedded in the Computing Device 905.

Computing Device 905 can be communicatively coupled to Input/User Interface 935 and Output Device/Interface 940. Either one or both of Input/User Interface 935 and Output Device/Interface 940 can be a wired or wireless interface and can be detachable. Input/User Interface 935 can include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output Device/Interface 940 can include a display, television, monitor, printer, speaker, braille, or the like. In some example implementations, Input/User Interface 935 and Output Device/Interface 940 can be embedded with or physically coupled to Computing Device 905. In other example implementations, other computing devices can function as or provide the functions of Input/User Interface 935 and Output Device/Interface 940 for Computing Device 905.

Examples of Computing Device 905 can include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing Device 905 can be communicatively coupled (e.g., via I/O Interface 925) to External Storage 945 and Network 950 for communicating with any number of networked components, devices, and systems, including one or more computing devices of the same or different configuration. Computing Device 905 or any connected computing device can be functioning as, providing services of, or referred to as a server, client, thin server, general machine, special-purpose machine, or another label.

I/O Interface 925 can include, but is not limited to, wired and/or wireless interfaces using any communication or I/O protocols or standards (e.g., Ethernet, 802.1 lx, Universal System Bus, WiMax, modem, a cellular network protocol, and the like) for communicating information to and/or from at least all the connected components, devices, and network in Computing Environment 900. Network 950 can be any network or combination of networks (e.g., the Internet, local area network, wide area network, a telephonic network, a cellular network, satellite network, and the like).

Computing Device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing Device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include Logic Unit 960, Application Programming Interface (API) unit 965, Input Unit 970, Output Unit 975, User Management 980, Information Exchange Module 985, and Database 990, Inter-Unit Communication Mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API Unit 965, it can be communicated to one or more other units (e.g., Logic Unit 960, Input Unit 970, Output Unit 975, User Management 980, Information Exchange Module 985, and Database 990). For example, after Input Unit 970 has received, via Network 950, device MAC addresses and/or user information, Input Unit 970 can use API Unit 965 to communicate the information to User Management 980. User Management 980 can, via API Unit 965, interact with the Logic Unit 960 to store or update in Database 990 correlated data between individual user information and corresponding MAC addresses of each user's device. User Management 980 also can, via API Unit 965, interact with Logic Unit 960 to retrieve from Database 990 individual user information that corresponds to specific device MAC addresses. Output Unit 975 can subsequently transmit the individual user information via Network 950.

In some instances, Logic Unit 960 can be configured to control the information flow among the units and direct the services provided by API Unit 965, Input Unit 970, Output Unit 975, User Management 980, and Database 990. For example, the flow of one or more processes or implementations can be controlled by Logic Unit 960 alone or in conjunction with API Unit 965.

In situations in which the systems discussed here collect personal information about users, or can make use of personal information, the users can be provided with an opportunity to control whether programs or features collect user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes can be made in these example implementations without departing from the subject matter described herein as defined in the appended claims and their equivalents.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A system, comprising:
a platform communicatively coupled to a plurality of devices, the platform includes a processor configured to:
receive image data of a product identifier from a first user device for identifying a product, the image data captured by a first user from the product using the first user device; retrieve product information descriptive of the product and aggregate the retrieved product information to generate a batch of product information that includes each piece of retrieved product information grouped with other pieces of the retrieved product information, the product information retrieved from a plurality of sources external to the platform, the product information comprises metadata;
in response to receiving the image data of the product identifier:
identify the product by processing the image data of the product identifier, and associate the batch of product information corresponding to the product with the product identifier, and
generate and transmit to the first user device data that displays at least a portion of the batch of product information corresponding to the captured product identifier, the transmitted portion of the batch of product information comprises a plurality of pieces of product information from a subset of the plurality of sources external to the platform; receive, from a second user device, a plurality of tags included in the metadata, the plurality of tags including:
a first tag comprising an identifier of the first user and a first indication that (i) the first user has performed a first data collection activity on at least a portion of the transmitted portion of the batch of product information and (ii) a type of data collection activity performed by the first user, wherein the first data collection activity performed by the first user comprises sharing the at least a portion of the transmitted portion of the batch of product information with the second user; and
a second tag comprising an identifier of the second user and a second indication that (i) the second user has performed a second data collection activity on at least a portion of the portion of the transmitted portion of the batch of product information shared by the first user and (ii) a type of data collection activity performed by the second user; and
in response to receiving the plurality of tags from the second user:
allocate at least one unit of a reward to the first user based at least in part on at least one of the first indication and the second indication from the second user device,
determine whether the second user is associated with an account for allocating the at least one unit of a reward,
in response to determining that the second user is not associated with the account, automatically generate an account for the second user and allocate the at least one unit of a reward to the account for the second user at least in part in response to both the received indication and generation of the account for the second user, and
in response to determining that the second user is associated with the account, allocate the at least one unit of a reward to the second user based at least in part on the indication; and
a memory coupled to the processor and configured to provide the processor with instructions.

2. The system of claim 1, wherein the second user device re-shares the portion of the transmitted portion of the batch of product information with a third user device, and wherein the platform is further configured to receive an indication, from the third user device, that the second user has re-shared the portion of the transmitted portion of the batch of product information and allocate, based at least in part on the indication from the third user device, (i) at least another unit of the reward to the second user if the second user is associated with the account and (ii) at least another unit of the reward to the first user.

3. The system of claim 2, wherein the processor is further configured to: receive an indication in the event that the third user purchases a corresponding product after receiving the portion of the transmitted batch of product information from the second user; and allocate at least one unit of the reward to the second user based at least in part on the indic ation.

4. The system of claim 1, wherein the processor is configured to allocate a first number of units of the reward for a first type of data collection activity and a second number of units of the reward for a second type of data collection activity.

5. The system of claim 1, wherein the processor is configured to allocate a firstreward for a first type of data collection activity and a second reward for a second type of data collection activity.

6. The system of claim 1, wherein the processor is further configured to receive a request from the first user to redeem at least one unit of the reward, and wherein to redeem at least one unit of the reward, the processor is configured to subtract at least one unit of the reward from the first user's account.

7. The system of claim 1, wherein the processor is further configured to provide, in response to a request from the first user, one or more of the following types of information associated with the first user's account: a total number of units of rewards available, atotal number of units of rewards redeemed, a number of units of rewards allocated during a specified time period, and a number of units of rewards redeemed during a specified time period.

8. A method, comprising:
receiving image data of a product identifier from a first user device for identifying a product, the image data captured by a first user from the product using the first user device; retrieving product information descriptive of the product and aggregating the retrieved
product information to generate a batch of product information that includes each piece of retrieved product information grouped with other pieces of the retrieved product information, the product information retrieved from a plurality of sources external to the platform, the product information comprises metadata;
in response to receiving the image data of the product identifier:
identifying the product by using the processor to process the image data of theproduct identifier, and associate the batch of product information corresponding to theproduct with the product identifier, and
generating and transmitting to the first user device data that displays at least a portion of the batch of product information corresponding to the captured product identifier, the transmitted portion of the batch of product information comprises a plurality of pieces of product information from a subset of the plurality of sources external to the platform;
receiving, from a second user device, a plurality of tags included in the metadata, the plurality of tags including:
a first tag comprising an identifier of the first user and a first indication that (i) the first user has performed a first data collection activity on at least a portion of the transmitted portion of the batch of product information and (ii) a type of data collection activity performed by the first user, wherein the first data collection activity performed by the first user comprises sharing the at least a portion of the transmitted portion of the batch of product information with the second user; and
a second tag comprising an identifier of the second user and a secondindication that (i) the second user has performed a second data collection activity on at least a portion of the portion of the transmitted portion of the batch of product information shared by the first user and (ii) a type of data collection activity performed by the second user; and
in response to receiving the plurality of tags from the second user:
allocating at least one unit of a reward to the first user based at least in part on at least one of the first indication and the second indication from the second user device,
determining whether the second user is associated with an account for allocating the at least one unit of a reward,
in response to determining that the second user is not associated with the account, automatically generating a new account for the second user and allocate the at least one unit of a reward to the new account for the second user at least in part in response to both the received indication and generation of the new account for the second user, and
in response to determining that the second user is associated with the account, allocating the at least one unit of a reward to the second user based at least in part on the indication.

9. The method of claim 8, further comprising receiving an indication, from a third user device, that the second user has re-shared the portion of the transmitted portion of the batch of product information with the third user device and allocating, based at least in part on the indication from the third user device, (i) at least another unit of the reward to the second user if the second user is associated with the account and (ii) at least another unit of the reward tothe first user, wherein the second user device re-shares the portion of the transmitted portion of the batch of product information received with a third user device.

10. The method of claim 9, further comprising:
receiving an indication in the event that the third user purchases a corresponding product after receiving the portion of the transmitted batch of product information from the second user; and allocating at least one unit of the reward to the second user based at least in part on the indication.

11. The method of claim 8, further comprising allocating a first number of units of the reward for a first type of data collection activity and a second number of units of the reward for a second type of data collection activity.

12. The method of claim 8, further comprising allocating a first reward for a first type of data collection activity and a second reward for a second type of data collection activity.

13. The method of claim 8, further comprising receiving a request from the first user to redeem at least one unit of the reward, and wherein to redeem at least one unit of the reward, the processor is configured to subtract at least one unit of the reward from the first user's account.

14. The method of claim 8, further comprising providing, in response to a request from the first user, one or more of the following types of information associatedwith the first user's account: a total number of units of rewards available, a total number of units of rewards redeemed, a number of units of rewards allocated during a specified time period, and a number of units of rewards redeemed during a specified time period.

15. A system, comprising:
a device associated with a first user and including a processor configured to:

capture image data of a product identifier, the image data captured by the device from a product;

send the image data of the product identifier from the device to a remote platform for identifying the product;

receive, from a second user, product information corresponding to and separate from the product, the product information obtained by the remote platform from a plurality of sources external to the platform based on the image data of the product identifier received by the remote platform, the product information comprises metadata;

determine, based at least in part on the product information, that the second user has performed a data collection activity on at least a portion of the received product information, wherein the data collection activity performed by the second usercomprises sharing the product information with the first user;

modify the product information by adding a tag to the metadata, the tag comprising an identifier of the second user and a first indication that (i) the data collection activity was performed on at least a portion of the received product information and a type of the data collection activity that was performed and (ii) the second user performed the data collection activity on the at least a portion of the received product information; and transmit, to the remote platform, the tag comprising the first indication, wherein the remote platform allocates at least one unit of a reward to the second user at least in part in response to the first indication from the device associated with the first user, wherein, in response to receiving the tag from the device associated with the first user, the remote platform determines whether the second user is associated with an account for allocating the at least one unit of the reward, and, in response to determining that the second user is not associated with the account, automatically generates a new account for the second user and allocates the at least one unit of the reward to the new account of the second user at least in partin response to both the received first indication and generation of the new account forthe second user; and a memory coupled to the processor and configured to provide the processor with instructions.

16. The system of claim 15, wherein the processor is further configured to:

receive, from the first user, a request to perform at least one data collection activity; perform, in response to the request, the at least one data collection activity;

modify the product information to include a second indication that the first user has performed the at least one data collection activity; and transmit, to the remote platform, the second indication.

17. The system of claim 16, wherein the at least one data collection activity performed by the first user comprises one of the following: a sharing of product information received from the remote platform, and a re-sharing of product information received fromthe second user with a third user.

18. The system of claim 16, wherein the processor is further configured to receive, from the remote platform, a message that at least one unit of another reward has been allocated to the first user based at least in part on the second indication that the first user has performed the at least one data collection activity.

19. The system of claim 15, wherein by transmitting the product information to the first user, the second user re-shares product information that the second user has received from a third user.

20. The system of claim 19, wherein the processor of the device associated with the first user is configured to:

determine, based at least in part on the product information received from the seconduser, that the third user has performed another data collection activity, wherein the product information received from the second user comprises a third indication that the third user performed the another data collection activity on the product information; and transmit, to the remote platform, the third indication that the third user has performed the another data collection activity.

21. A method, comprising:

capturing image data of a product identifier, the image data captured by a device associated with a first user from a product;

sending, by the device associated with the first user, the image data of the product identifier to a remote platform for identifying the product;

receiving, at the device associated with the first user, product information from a second user corresponding to and separate from the product, the product information obtained by the remote platform from a plurality of sources external to the remote platform based on the image data of the product identifier received by the remote platform;

determining, using a processor, that the second user has performed a data collection activity on at least a portion of the received product information based at least in part on the product information, wherein the data collection activity performed by the second usercomprises sharing the product information with the first user;

modifying, by the device associated with a first user, the product information by adding a tag to the metadata, the tag comprising an identifier of the second user and a first indication that (i) the data collection activity was performed on at least a portion of the received product information and a type of the data collection activity that was performed and (ii) the second user performed the data collection activity on the at least a portion of the received product information;

transmitting, to the remote platform, the tag comprising the first indication, wherein the remote platform allocates at least one unit of a reward to the second user at least in part in response to the first indication from the device associated with the first user; and in response to receiving the tag from the device associated with the first user, determining, by the remote platform, whether the second user is associated with an account for allocating the at least one unit of the reward, and, in response to determining that the second user is not associated with the account, automatically generates a new account for the second user and allocates the at least one unit of the reward to the new account of the second user at least in part in response to both the received first indication andgeneration of the new account for the second user.

22. The method of claim 21, further comprising:

receiving, from the first user, a request to perform at least one data collection activity; performing, in response to the request, the at least one data collection activity; modifying the product information to include a second indication that the first user has performed the at least one data collection activity; and transmitting, to the remote platform, the second indication.

23. The method of claim 22, wherein the at least one data collection activity performed by the first user comprises one of the following: a sharing of product information received from the remote platform, and a re-sharing of product information received from the second user.

24. The method of claim 22, further comprising receiving, from the remote platform, a message that at least one unit of another reward has been allocated to the first user based at least in part on the second indication that the first user has performed the at least one data collection activity.

25. The method of claim 21, wherein by transmitting the product information to the first user, the second user re-shares product information that the second user has received from a third user.

26. The method of claim 25, further comprising:
determining, based at least in part on the product information received from the second user, that the third user has performed another data collection activity, wherein the product information received from the second user comprises a third indication that the third user has performed the another data collection activity; and
transmitting, to the remote platform, the third indication that the third user has performed the another data collection activity.

27. . The system of claim 1, wherein the platform is further configured to receive concomitant information comprising information about an environment in which the image data is captured, wherein the at least a portion of the batch of product information transmitted to the first user device is selected based on the concomitant information.

28. The method of claim 8, receiving concomitant information comprising information about an environment in which the image data is captured, wherein the at least a portion of the batch of product information transmitted to the first user device is selected basedon the concomitant information.

29. The system of claim 1, wherein the batch of product information comprises at least an instruction manual of the product and one or more of: a detailed description of the product, composition of the product, material of the product, handling instructions of the product, care instructions of the product, an Internet link to the manufacturer of the product, related or alternative products and/or services, and promotions corresponding to the product.

30. The system of claim 27, wherein concomitant information comprising information about the environment in which the image data is captured comprises at leastone or more of a time that the image data is captured and a location that the image data is captured.

31. The system of claim 15, wherein the metadata of the product information comprises a plurality of tags, each comprising an identifier of a user and an indication of a data collection activity performed by the respective user, wherein the device associatedwith the first user is configured to transmit, to the remote platform, the plurality of tags, wherein the remote platform allocates at least one unit of reward to users based in part on the received tags.

32. The system of claim 1, wherein the plurality of tags comprises identifiers of users and indications of data collection activities performed on the batch of product information by the users, wherein the platform is configured to:
use the plurality of tags to track data collection activities performed on the batch of product information.

* * * * *